United States Patent [19]

Sills et al.

[11] Patent Number: 4,972,277

[45] Date of Patent: Nov. 20, 1990

[54] CARTRIDGE TRANSPORT ASSEMBLY AND METHOD OF OPERATION THEREOF

[75] Inventors: Richard E. Sills, Longmont; Zoltan L. Herger, Boulder, both of Colo.

[73] Assignee: Exabyte Corporation, Boulder, Colo.

[21] Appl. No.: 269,391

[22] Filed: Nov. 10, 1988

[51] Int. Cl.$^5$ ............................................. G11B 15/68
[52] U.S. Cl. .................................................... 360/92
[58] Field of Search ...................... 360/92; 369/34, 36; 294/81.52, 106; 414/273, 280, 282

[56] References Cited

U.S. PATENT DOCUMENTS

| | | | |
|---|---|---|---|
| 4,608,679 | 8/1986 | Rudy et al. ............................ | 369/34 |
| 4,675,856 | 6/1987 | Rudy et al. ............................ | 369/34 |
| 4,685,095 | 8/1987 | Rudy et al. ............................ | 369/34 |
| 4,731,682 | 3/1988 | Nishiyama et al. ................... | 360/92 |
| 4,742,504 | 5/1988 | Takasuka et al. ..................... | 369/34 |
| 4,815,055 | 3/1989 | Fago, Jr. ............................... | 369/36 |
| 4,815,056 | 3/1989 | Toi et al. ............................... | 369/30 |
| 4,817,070 | 3/1989 | Hug et al. .............................. | 369/36 |

FOREIGN PATENT DOCUMENTS 56-19551  2/1981  Japan ..................................... 360/92

OTHER PUBLICATIONS

"7110 Automated Tape Library", Braegen.
"Automatisches Bandkassetten Bedienungs Archiv (ABBA) fur IBM 3480", Garu Feinwerktechnik GmbH & Co.
"Von der Vision Zur Realisation", ABBA-das Robotersystem fur 3480-Kassetten, GRAU.
"Automation: Freedom of Information Management", 4400 Automated Cartridge Systems, Storage Technology Corporation, 1987.
"M860 Storage Management System Equipment Description" (MSC-9015) and Shared Virtual Storage System Description (MSC-8608), Masstor Systems.
"Automatic Random Access Cart System ASACA ACL-6000B", ASCAA Corporation.

*Primary Examiner*—Robert S. Tupper
*Attorney, Agent, or Firm*—Griffin Branigan & Butler

[57] ABSTRACT

An automated magnetic tape cartridge library system includes a cabinet (24) having a door (26) removably and pivotally connected thereto. The cabinet (24) houses a plurality of tape drives (56A-56E) and a plurality of racks (70) wherein magnetic tape cartridges are stored. A cartridge transport assembly (100) serves to retrieve a cartridge from a rack (70) and to load the cartridge into a target tape drive (56), and vice versa. Movement of the cartridge transport assembly (100) along X, Y, and Z rectangular coordinate axes is effected by X, Y, and Z displacement systems (104, 106, 108). The cartridge transport assembly (100) and the X, Y, and Z displacement systems (104, 106, 108) are all mounted on the removable, pivotal door (26). The cartridge transport assembly (100) includes a pair of engagement fingers (402A, 402B) which engage a selected cartridge upon contact with the cartridge. In an engagement mode, engagement fingers (402A, 402B) are configured and oriented to engage notches provided on opposite edges of standard 8 mm magnetic tape cartridge such that, upon engagement, the cartridge is locked between the fingers (402A, 402B) without the need of further locking mechanisms. Portions of the linkage means of the cartridge transport assembly (100) dually function as ram elements (452A, 452B) for closing a tape drive door (60) once a cartridge is loaded into a target tape drive (56).

40 Claims, 17 Drawing Sheets

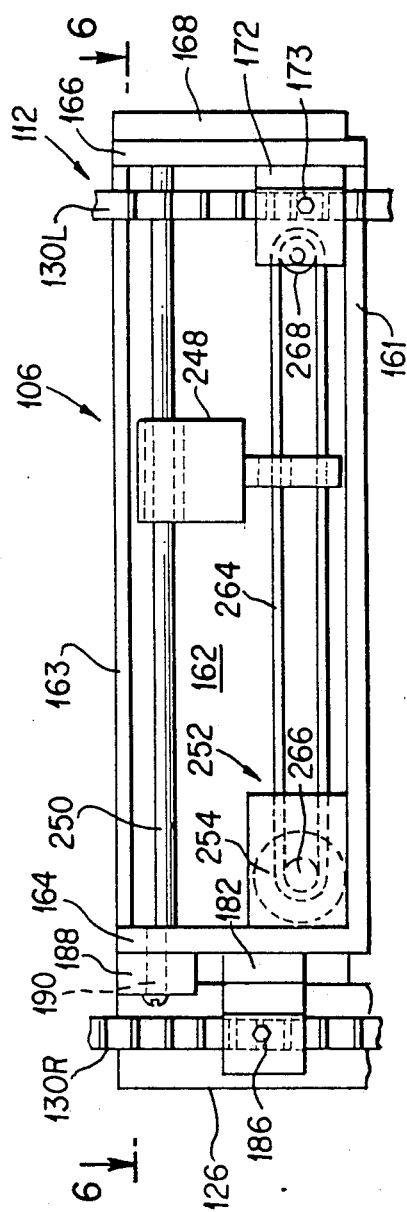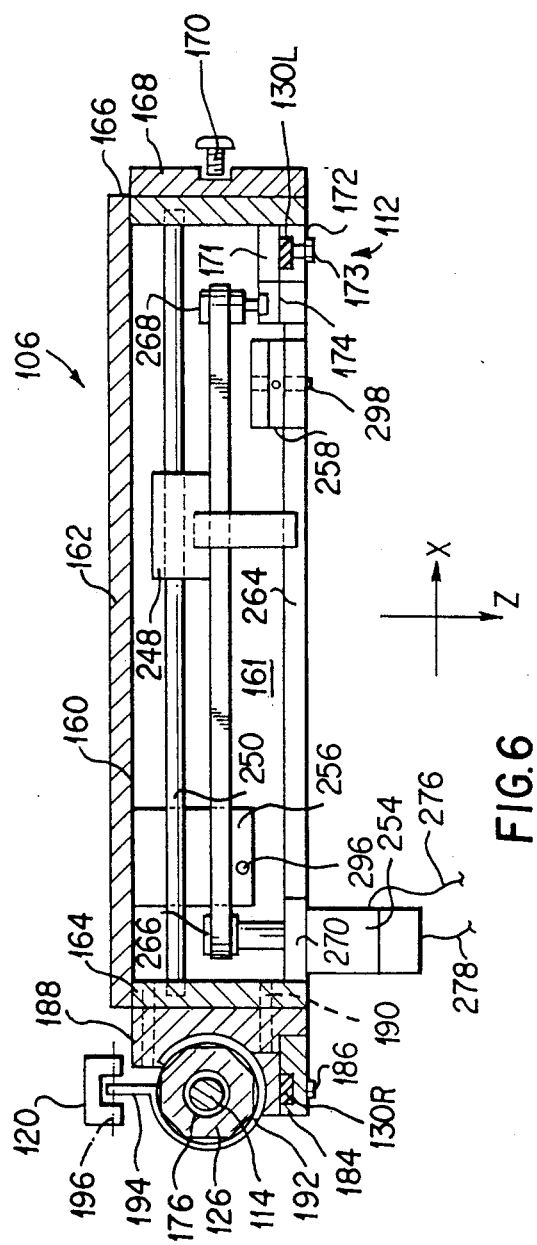
FIG.5
FIG.6

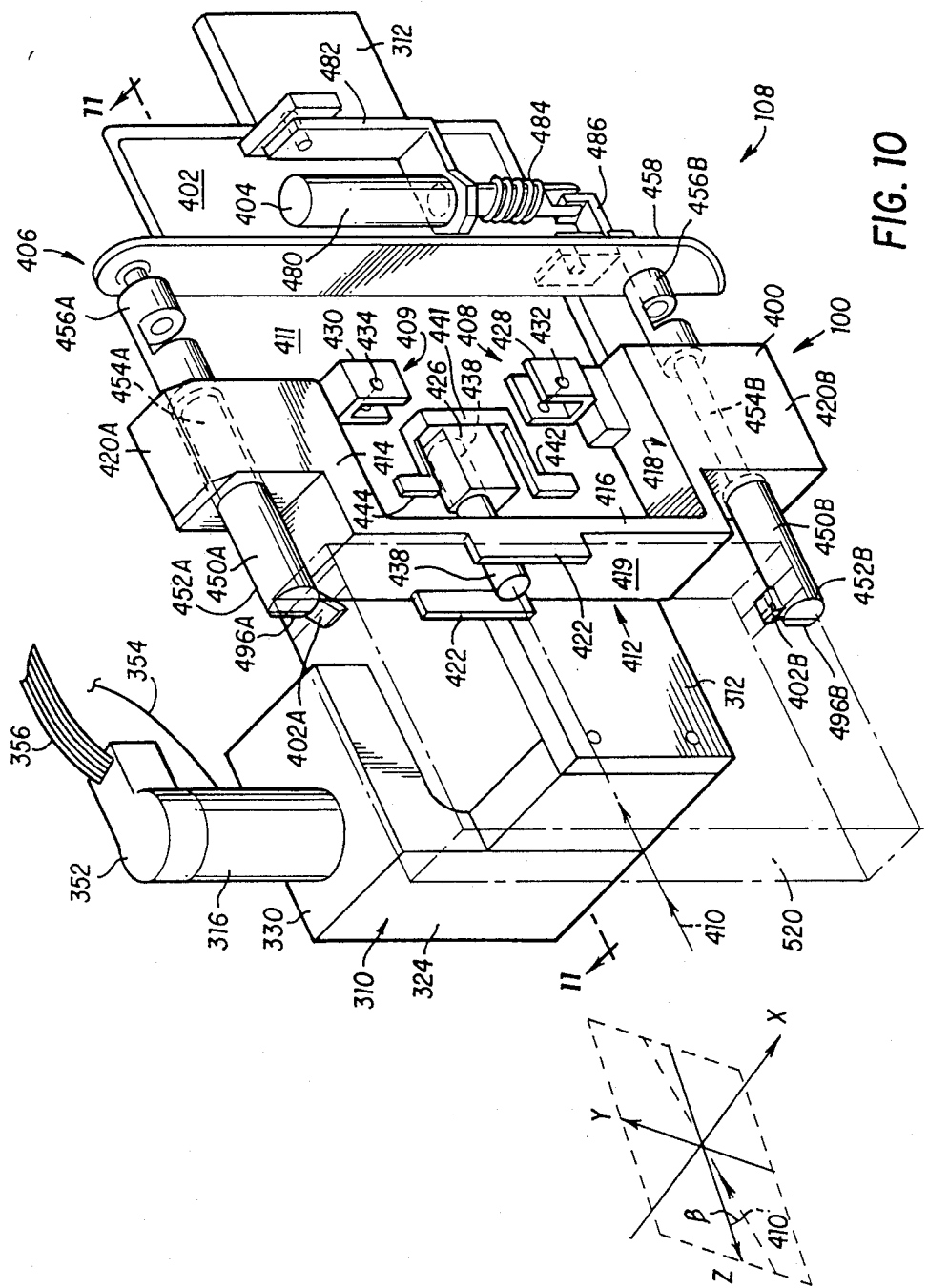

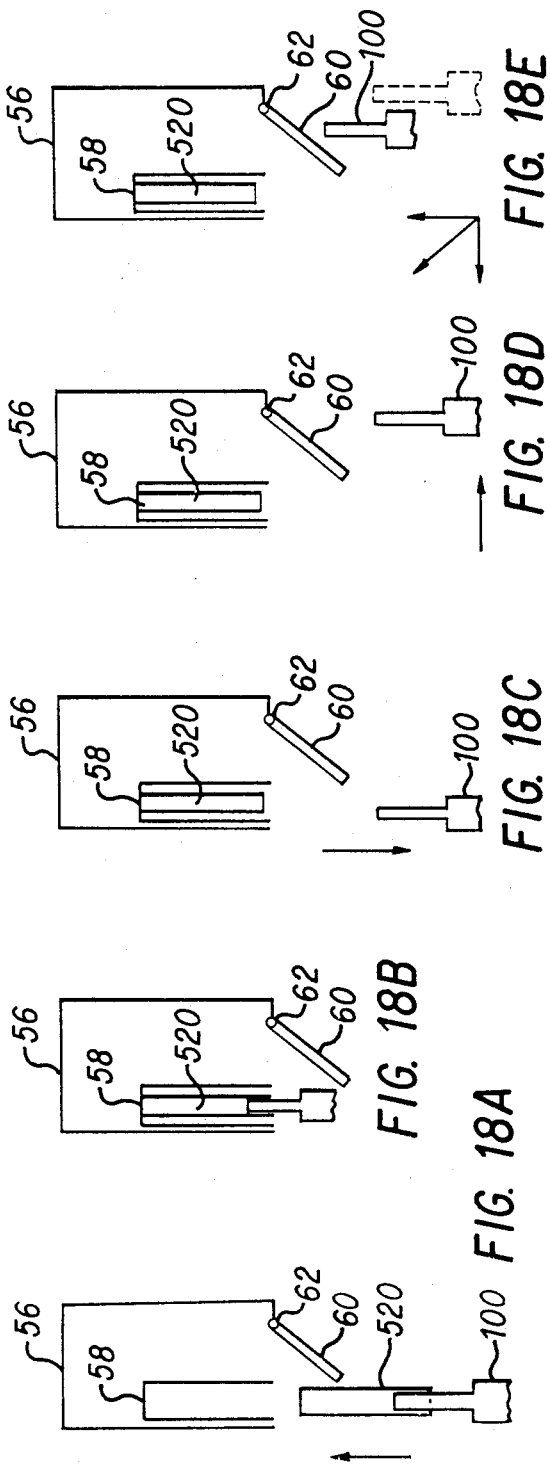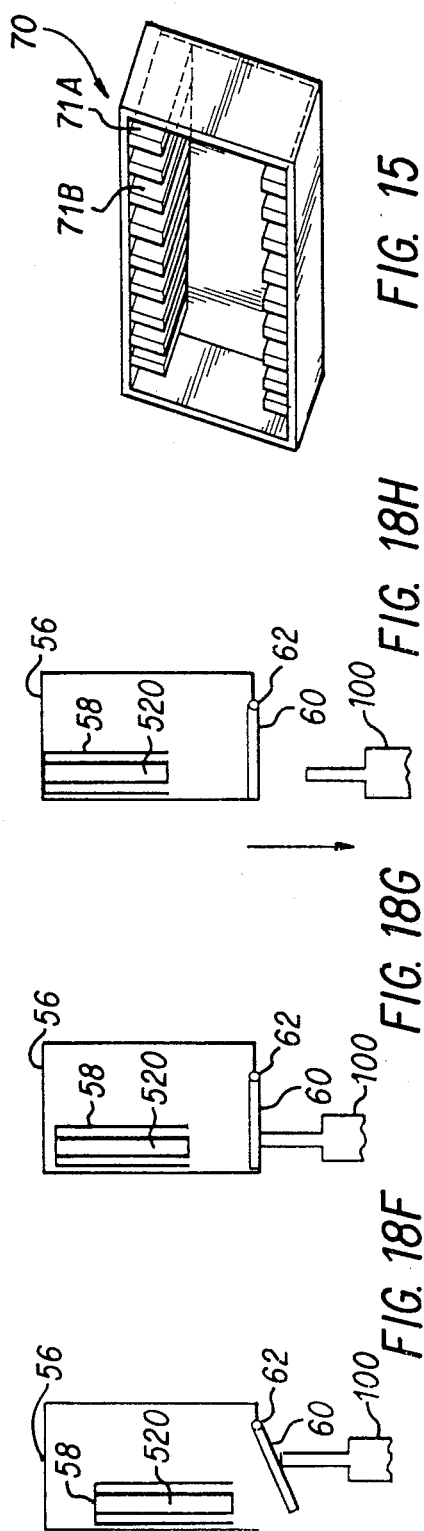

CARTRIDGE TRANSPORT ASSEMBLY AND METHOD OF OPERATION THEREOF

BACKGROUND

1. Field of the Invention

This invention relates to method and apparatus for the storage, retrieval, and loading of units of data storage medium, and particularly to method and apparatus for the storage, retrieval, and loading of cartridges of data storage medium, such as magnetic tape.

2. Prior Art and Other Considerations

A data processing system includes a central processing unit which operates on data stored in a memory. To varying degrees, all data processing systems have central or on-board memory devices which give the central processing unit essentially immediate access to the data stored therein. The cost of such central memory is fairly significant, with the result that data has long been stored on storage media, one form of which being magnetic tape. The storage medium is traditionally provided in a unit, such as a reel or cartridge. The computer system reads data from the storage medium, and writes data to the storage medium, in conjunction with a peripheral media-handling device, such as a tape drive, that physically handles the storage medium. In this regard, the computer system, through an appropriate interface device or chip, communicates with the peripheral device to request the read/write operations conducted by the peripheral device and to control the transfer of data between the computer and the peripheral device.

Large computer systems typically operate in conjunction with a number of peripheral media-handling devices. For example, a host computer might access four, five, or more tape drives. Each peripheral media-handling device can only operate on one unit of storage medium at any given time, which unit is said to be loaded into or mounted on the media-handling peripheral. However, a plurality of units, perhaps hundreds, can be associated with one or more peripheral, and mounted or loaded thereon at the proper time. To this end, sizable libraries consisting of racks for storing the large number of units, such as reels, have traditionally been located proximate the peripheral devices.

At the birth of the information storage and retrieval industry, magnetic tape reels were manually mounted on tape drives by human operators. Although the data processing system functioned in fractions of seconds, the human selection and manipulation of the tape reels was significantly longer, which occasioned considerable delays. Such was particularly true when the operator had to locate one reel out of myriads, visually verify the selection, and mount the reel on the proper tape drive.

Automated tape libraries were developed to expedite the selection and loading of magnetic tape reels. One such automated tape library resembles an elongated rectangular room. Racks of tape reels are provided at selected locations along the interiors of the opposing elongated walls. An interior track runs the length of the room between the parallel racks. A reel retrieval/loading device is mounted on a carriage that travels along the track, and is translatable along two rectangular axes in addition to the third axis of the track. The retrieval/loading device is automatically controlled to locate and engage a selected reel in a Cartesian coordinate system, and then transports the selected reel to a target on one of a plurality of tape drives. The tape drives are located along the exterior wall of the room at windows provided for access to the drives. The retrieval/loading device automatically mounts the selected reel on the target tape drive.

Another prior art configuration for a storage library features a cylindrical room, with storage racks provided along the interior of the circular wall and a plurality of peripheral devices located along the exterior at windows. The retrieval/loading device is positioned in the center of the room, and is operated in a cylindrical coordinate fashion.

The prior art retrieval/loading devices are complicated mechanisms. The retrieval/loading devices require not only structure for translation along three axes, but also entail structure for precise engagement of the units of storage medium. Although the complex structure of these prior art retrieval/loading devices invite considerable maintenance and repair, the location of the devices does not facilitate ready access or removal. Moreover, replacement of the retrieval/loading device is very costly from the standpoint of labor and down time.

The complex structure of prior retrieval/loading device for libraries results in large part from the number of mechanisms required to perform specialized operations. As an example, once a unit of storage medium is engaged, a separate locking mechanism is required lest the unit be mishandled or dropped. Mishandling can damage the unit and perhaps cause errors on the storage medium. Dropping the unit can not only damage the unit, but can also obstruct operation of the retrieval/loading device.

Magnetic tape cartridges have recently become popular as a unit of storage medium, particularly 8 mm magnetic tape cartridges (as used herein, the term "cartridge" also refers to magnetic tape cassettes). Advantageously, magnetic tape cartridges facilitate economic and compact storage of data. However, an automated library system which overcomes the aforementioned problems of prior art libraries has heretofore not been provided.

In view of the foregoing, it is an object of the present invention to provide method and apparatus for simply and securely engaging and disengaging a magnetic tape cartridge.

Another object of the present invention is the provision of an automated library system wherein a retrieval/loading device is easily accessible.

An advantage of the present invention is the provision of a modular and replaceable retrieval/loading device for an automated library system.

Another advantage of the present invention is the provision of a retrieval/loading device and method of operation therefor that facilitates a multiplicity of operations.

SUMMARY

An automated magnetic tape cartridge libary system includes a cabinet having a door removably and pivotally connected thereto. The cabinet houses a plurality of tape drives and a plurality of racks wherein magnetic tape cartridges are stored. A cartridge transport assembly serves to retrieve a cartridge from a rack and to load the cartridge into a target tape drive. Movement of the cartridge transport assembly along X, Y, and Z rectangular coordinate axes is effected by X, Y, and Z displacement systems. The cartridge transport assembly and the X, Y, and Z displacement systems are all mounted on the removable, pivotal door.

The Y displacement system is mounted on the door and includes a Y-carriage which is translatable along the Y axis. The Y-carriage carries the X displacement system, which includes an X-carriage. The X-carriage in turn carries the Z displacement system, including a Z-carriage. The Z-carriage carries the cartridge transport assembly.

The cartridge transport assembly includes a pair of engagement fingers which engage a selected cartridge upon contact with the cartridge. In an engagement mode, enagement fingers are configured and oriented to engage changer grip notches provided on opposite edges of standard 8 mm magnetic tape cartridges such that, upon engagement, the cartridge is locked between the fingers without the need of further locking mechanisms.

The cartridge transport assembly also includes means for detecting when a cartridge is positioned to be loaded (either into a target drive or into a storage rack). In particular, when a cartridge is positioned for loading, abutment of the cartridge with the drive or rack forces the cartridge flush against the cartridge transport assembly and depresses a plunger. When depression of the plunger is detected, a solenoid carried on the cartridge transport assembly operates via linkage means to rotate the engagement fingers out of the cartridge notches. The cartridge is thus released or loaded into the awaiting target drive or target rack.

Portions of the linkage means of the cartridge transport assembly dually function as ram elements for closing a tape drive door once a cartridge is loaded into a target tape drive. In this regard, after a cartridge is loaded into a target drive, the cartridge transport assembly retreats from the target drive and is displaced to a side thereof. The cartridge transport assembly is then moved with respect to the X and Z axes to provide the ram elements with components of motion suitable for closing the pivotal door of the tape drive.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 is a partial rear view of a Y-carriage of the cartridge library system of the embodiment of FIG. 1, but not having a cartridge transport assembly mounted thereon.

FIG. 6 is a sectional view taken along line 6—6 of FIG. 5.

FIG. 7 is a cross sectional top view of a Y-carriage interface element of the embodiment of FIG. 1.

FIG. 8 is a sectional view taken along line 8—8 of FIG. 7.

FIG. 9 is a partial left side view of an X-carriage of the cartridge library system of the embodiment of FIG. 1.

FIG. 10 is an isometric view of a cartridge transport assembly and a Z-carriage of the cartridge library system of the embodiment of FIG. 1.

FIG. 15 is an isometric view of a cartridge rack of the cartridge library system of the embodiment of FIG. 1.

FIGS. 18A–18H are schematic views showing sequential steps involved with the release of a cartridge from a cartridge transport assembly and the closing of a tape drive door by the cartridge transport assembly.

DETAILED DESCRIPTION OF THE DRAWINGS

Figure 1:
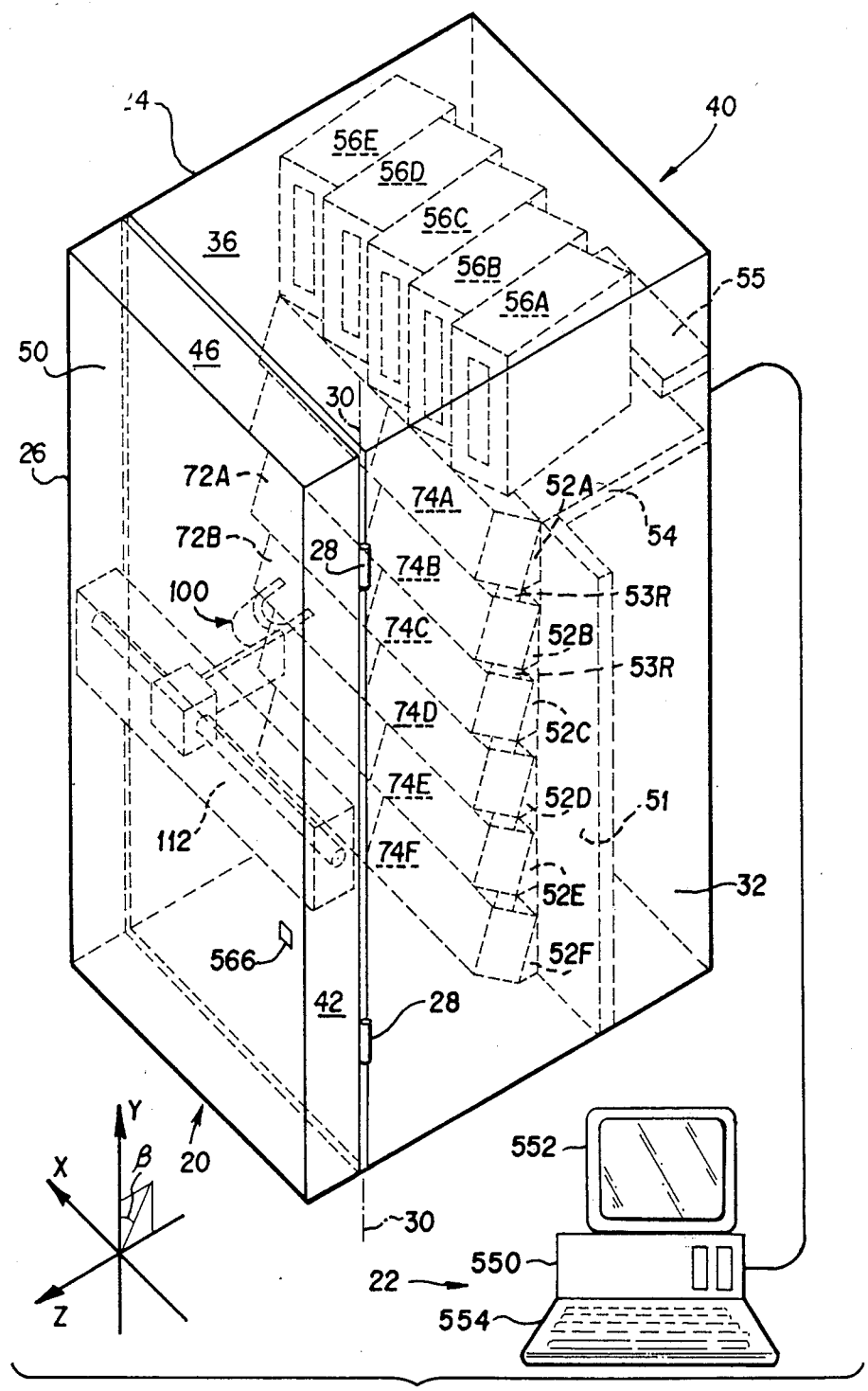
FIG. 1 is an isometric view of a cartridge library system according to an embodiment of the invention.

The cartridge library system of FIG. 1 includes both a library system frame 20 and a library controller ("LC") computer system 22. The library system frame 20 has a rectangular cabinet 24 and a door 26. The door 26 has transparent glass 27 mounted therein (see FIG. 3). The door 26 is pivotally connected, as by hinges 28 for example, along a front corner of the cabinet 24, so that door 26 pivots about axis 30 proximate that front corner.

The cabinet 24 is comprised of a plurality of planar cabinet panels, including a right side panel 32; a left side panel 34; a top panel 36; a bottom panel 38; and, a rear panel 40. Likewise, the door 26 is comprised of a plurality of planar panels, including a right side panel 42; a left side panel 44; a top panel 46; a bottom panel 48; and, a front panel 50. Front panel has the transparent glass 27 mounted therein. The aforementioned hinges 28 thus connect door right side panel 42 to the cabinet 24 so that door 26 pivots about axis 30. Were door 26 not pivoted to a closed position, the cabinet 24 would be open.

FIG. 1 further shows three dimensional axes, in particular an X axis, a Y axis, and a Z axis. From the foregoing and the FIG. 1 illustration of these axes, it should be understood that each of the aforedescribed cabinet and door panels each have exterior surfaces which lie in planes described with reference to these axes. For example, cabinet right side panel 32 and door right side panel 42 both have exterior surfaces which lie in a YZ plane; cabinet top panel 36 and door top panel 46 both have exterior surfaces which lie in an XZ plane; and, cabinet rear panel 40 and door front panel 50 both have exterior surfaces which lie in XY planes. Thus, it should also be understood that the axis 30, about which door 26 pivots, is parallel to the Y axis.

STRUCTURE: CABINET

The library system cabinet 24 also includes a vertically erect wall 51 mounted on the cabinet bottom panel 38. Wall 51 extends approximately three quarter of the height of the cabinet 24 (taken in the sense of the Y axis) and has six slanted shelves 52A-52F provided on a front face thereof. The front surfaces of shelves 52 are oriented at an angle beta with respect to an XY plane. In the preferred embodiment, angle beta is on the order of about 8 degrees. At the front lower ends thereof, each of the shelves 52 have support lips 53L, 53C, and 53R provided at left, central, and right locations thereon.

The top edge of wall 51 supports a front end of a removable horizontal drive shelf 54. A circuit board-mounting shelf 55, positioned above the shelf 54 and secured to the interior surface of cabinet right side panel 32, is also in a horizontal orientation.

Figure 2:
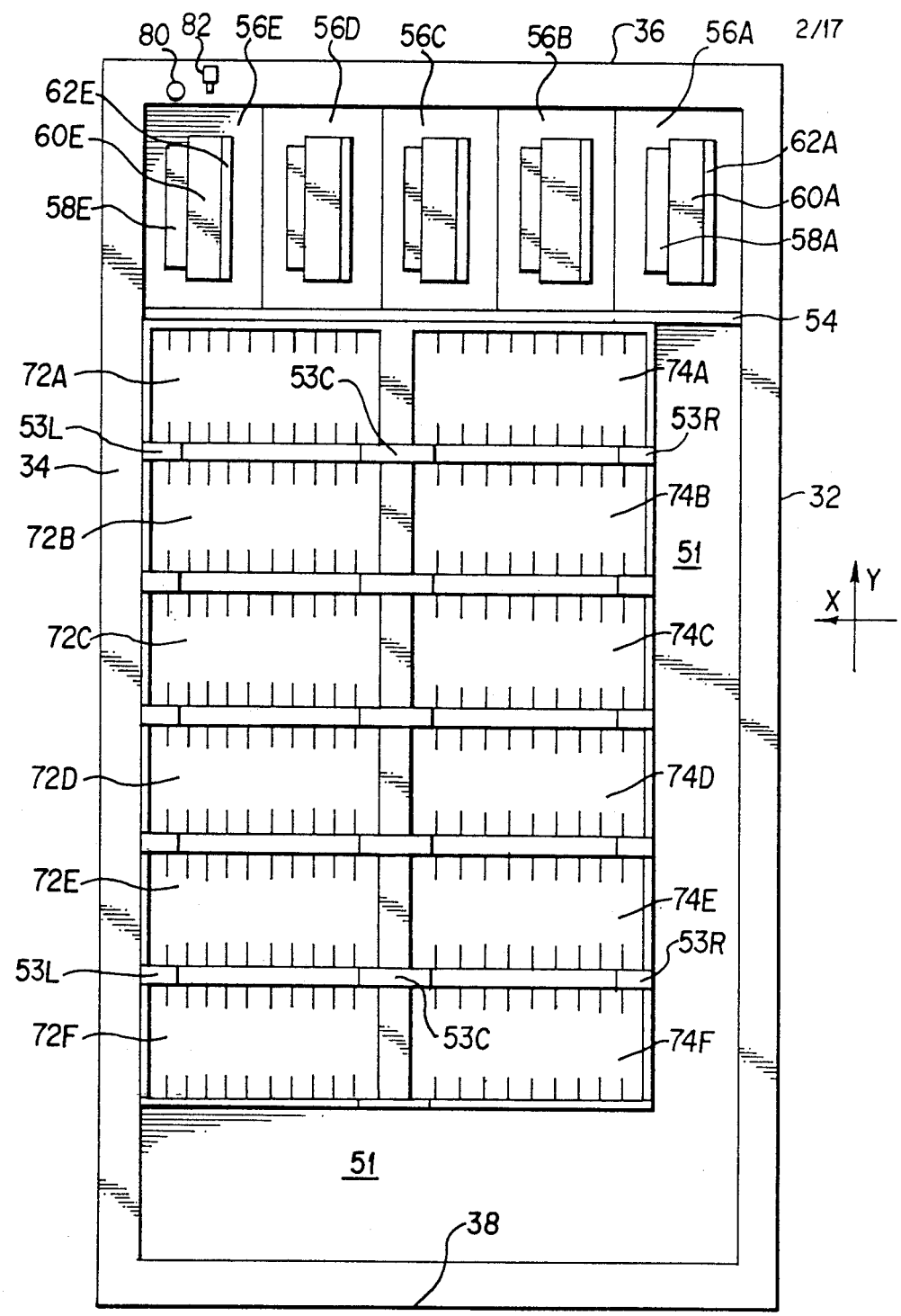
FIG. 2 is a front view of a cabinet of the cartridge library system of the embodiment of FIG. 1.

As shown in FIG. 2, the cabinet shelf 54 has a plurality of tape drives mounted thereon, and particularly five tape drives 56A-56E. Each tape drive has a cartridge cell 58 and a drive door 60, with the drive door 60 being pivotal about a hinge axis 62. In the preferred embodiment, the drives 56 are those marketed by Exabyte Corporation under part number Exabyte 8200. The drives 56 are contiguously arranged along the X axis. As shown in FIG. 1, the front surface of each drive 56 is angularly inclined with respect to the door front panel 50. Moreover, each drive 56 has its front surface oriented at the angle beta with respect to an XY plane. Corresponding points on the drives, and hence corresponding points on the cartridge cells 58 of each drive 56, are equidistant from the door front panel 50 (and, consequentially, from the frame rear panel 40).

The cabinet wall 51 has mounted thereon a cartridge library wherein racks 70 of magnetic tape cartridges 71 are storable. As shown in FIG. 15, each cartridge rack 71 is an elongated rectangular member having an open face. Each rack 71 has nine pairs of partitions 71A defining ten cells 71B. Each cell 71B is sized to accommodate a standard 8 mm tape cartridge.

The cartridge library includes a left column 72 of cartridge racks 72A-72F and a right column 74 of cartridge racks 74A-74F. Each column 72, 74 of the cartridge library thus has six rows of cartridge racks 70. The cartridge racks 71 in each row are supported beneath by the support lips 53 provided on shelves 52, and lean against the inclined shelves 52. For example, cartridge rack 74A is supported by lips 53R and 53C of shelf 52A; cartridge rack 72A is supported by lips 53C and 53L of shelf 52A; and so forth.

Since each cartridge rack 70 stores 10 cartridges therein, a total of 120 cartridges are storable in the cartridge library of the illustrated embodiment. The open face of each cartridge rack 71 faces the front of the cabinet 24, i.e., faces the door 26, with all racks 71 being oriented at the angle beta with respect to an XY plane by virtue of being situated on shelves 52. Moreover, comparable points of all racks 71 are equidistant in the sense of the Z axis from the door 26. It should be understood that in other embodiments the size of the cartridge library may vary to include either a greater or lesser number of cartridge racks, and hence a greater or lesser number of cartridges.

The front edge of the cabinet top wall 36 has a door close sensor 80 mounted thereon, which is a switch responsive to the closing of frame door 26. The cabinet top wall 36 is also provided with a door lock solenoid 82. When the door 26 is not to be opened, a plunger of the door lock solenoid 82 engages a corresponding bore 84 in the door 26.

STRUCTURE: DOOR

The door 26 carries a cartridge transport assembly 100, the details of which will be described below. The cartridge transport assembly 100 is displaceable along the X, Y, and Z axes by respective X, Y, and Z displacement systems 104, 106, and 108. Each of the displacement systems 104, 106, and 108 is mounted on the interior of door 26. Accordingly, the displacement systems 104, 106, and 108 can be easily serviced and repaired by conveniently removing the door from cabinet 24 at hinges 28.

The Y displacement system 106 includes a Y direction displaceable carriage, also known as Y-carriage 112. The Y displacement system 106 further includes a Y-path guide rod 114 (hidden in FIG. 3, but visible in FIGS. 4-7); Y-drive belt assembly 116; a Y-drive motor 118; Y-path sensors 120 and 122; and, counterbalance system 124.

The Y-path guide rod 114 is a vertically extending rod anchored to the door 26 on the interior of the door top panel 46 and the door bottom panel 48 near door right side panel 42. As described in greater detail below, the Y-path guide rod 114 extends through a translatable Y-carriage interface element 126.

The Y-drive belt assembly 116 includes both right Y-belt 130R and left Y-belt 130L. the fight Y-belt 130R is entrained about pulleys 132 and 134. The left Y-belt 130L is entrained about pulleys 136 and 138. Pulleys 132 and 136 are mounted on a common rotatable axle 140. Axle 140 is held aloft near the underside (interior) of door top panel 46 by inverted L-shaped brackets 142 mounted on door top panel 46. The axle 140 rotatably extends through bearings provided in the brackets 142. So positioned, pulley 132 is proximate the upper right corner of door 26 (seen on the left when viewed from the rear as in FIG. 3) and pulley 136 is proximate the upper left corner of door 26 (seen on the right when viewed from the rear as in FIG. 3). Pulley 138 is rotatably mounted in L-shaped bracket 144, with bracket 144 being mounted to the interior of door bottom panel 38 so that pulley 138 is directly beneath pulley 136 in the vertical (Y direction) sense. The pulleys 138 and 132 are eccentrically mounted on their shaft to facilitate self-tightening of the left Y-belt 103L.

The pulley 134 is securely mounted onto the rotatable output shaft of Y-drive motor 118. The housing of motor 118 is mounted to the interior of the door bottom panel 38 by bracket assembly 146, through which the output shaft extends unimpeded. The Y-drive motor 118 includes a tachometer 148. The Y-drive motor is connected by cable 150 to hereinafter-described circuitry, as is tachometer 148 by cable 152.

The Y-carriage 112 includes a Y-carriage frame 160 (shown in detail in FIGS. 5 and 6) and the aforementioned carriage interface element 126. The Y-carriage frame 160 has a frame bottom wall 161; a frame front wall 162; a frame top wall 163; a frame right side wall 164; and, a frame left side wall 166 (in FIGS. 5 and 6, which are taken from the rear, the left and right directions appear reversed). On its exterior, the right side wall 164 had the carriage interface element 126 mounted thereto. The left side wall 166 has a track follower element 168 mounted thereon. When viewed from above (as seen in FIG. 6), the track follower element 168 is substantially U-shaped, with a cavity existing in the interior of element 168 to permit element 168 to ride on a vertical track 170 provided on the interior surface of door left side wall 44.

Near Y-carriage left side wall 166, the carriage bottom wall 161 has two upstanding brackets mounted thereon. Bracket 171 cooperates with clamp 172 and fastener 173 to sandwich two ends of Y-drive belt 130L therebetween. As described hereinafter, bracket 174 supports structure associated with the X displacement system.

The Y-carriage interface element 126 is an elongated element which is primarily octagonal in cross section (see FIGS. 7 and 8). Interface element 126 has a central bore provided therein, the bore being sized to accommodate a ball bushing bearing, such as Thompson linear bearing 176, and the Y-path guide rod 114. Near its midsection, the interface element 126 has an integral L-shaped flange 178 extending from the side thereof. The flange 178 includes a first leg 180 and a second leg 182. As shown in FIG. 7, at the intersection of legs 180 an 182 the two ends of right Y-belt 130R are sandwiched between leg 180 and clamp 184, and secured therebetween by fastener 186. Near its top, the carriage interface element has a mounting flange 188, through which fasteners 190 extend to affix interface element 126 to the Y-carriage frame, and particularly to the Y-carriage right side wall 164.

Near its lower end, the Y-carriage interface element 126 has a metallic member 192 wrapped therearound. The metallic member 192 has frontwardly-extending flange 194 provided thereon and so positioned that flange 194 can break a photocell beam 196 of Y-sensor 120 (when the Y-carriage 112 is at the lowest permissible extent of its travel along the Y axis) or a similar photocell path of Y-sensor 122 (when the Y-carriage 112 is at the highest permissible extent of its travel along the Y axis).

Figure 3:
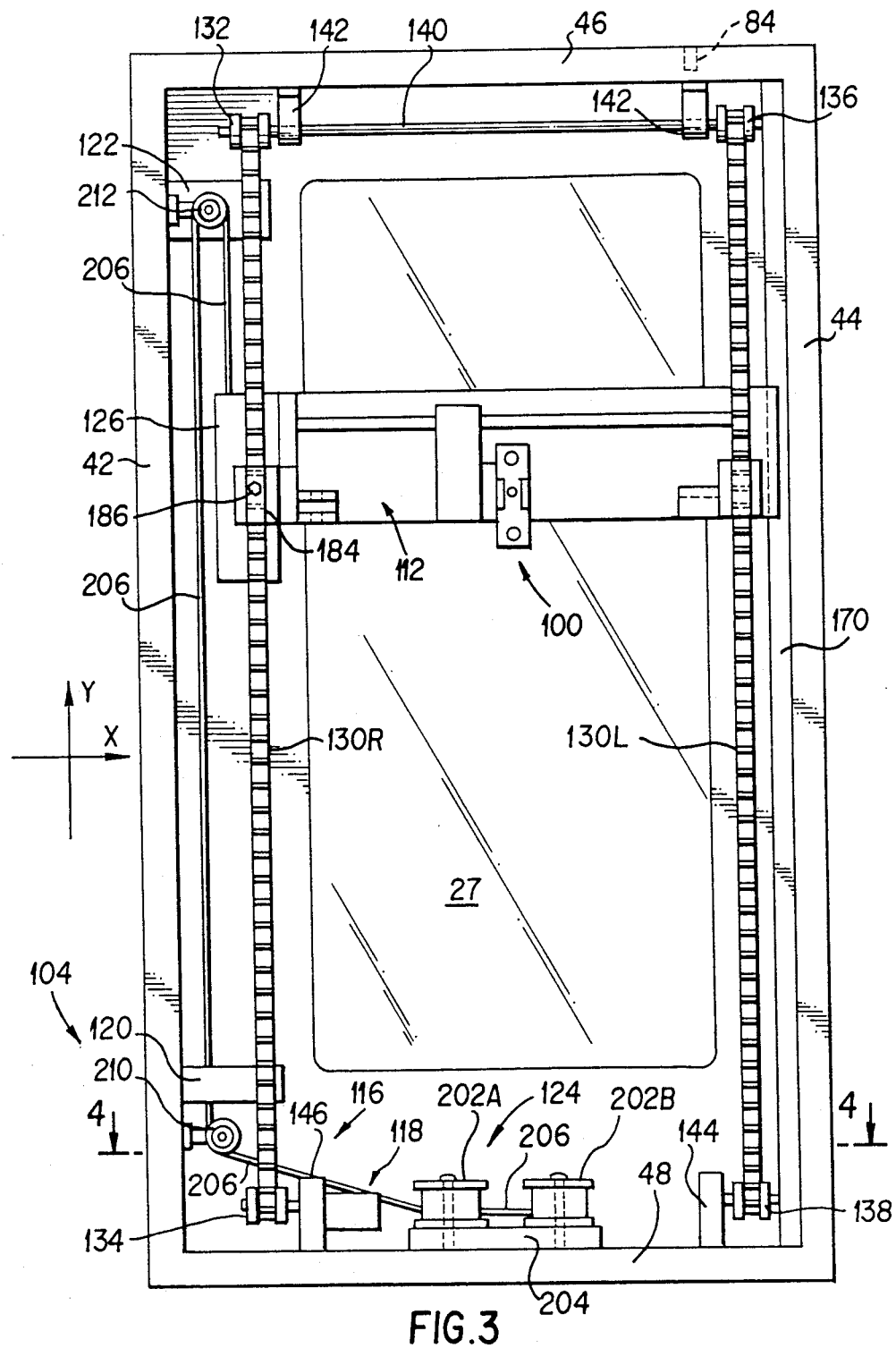
FIG. 3 is a rear view of a door interior of the cartridge library system of the embodiment of FIG. 1.
Figure 4:
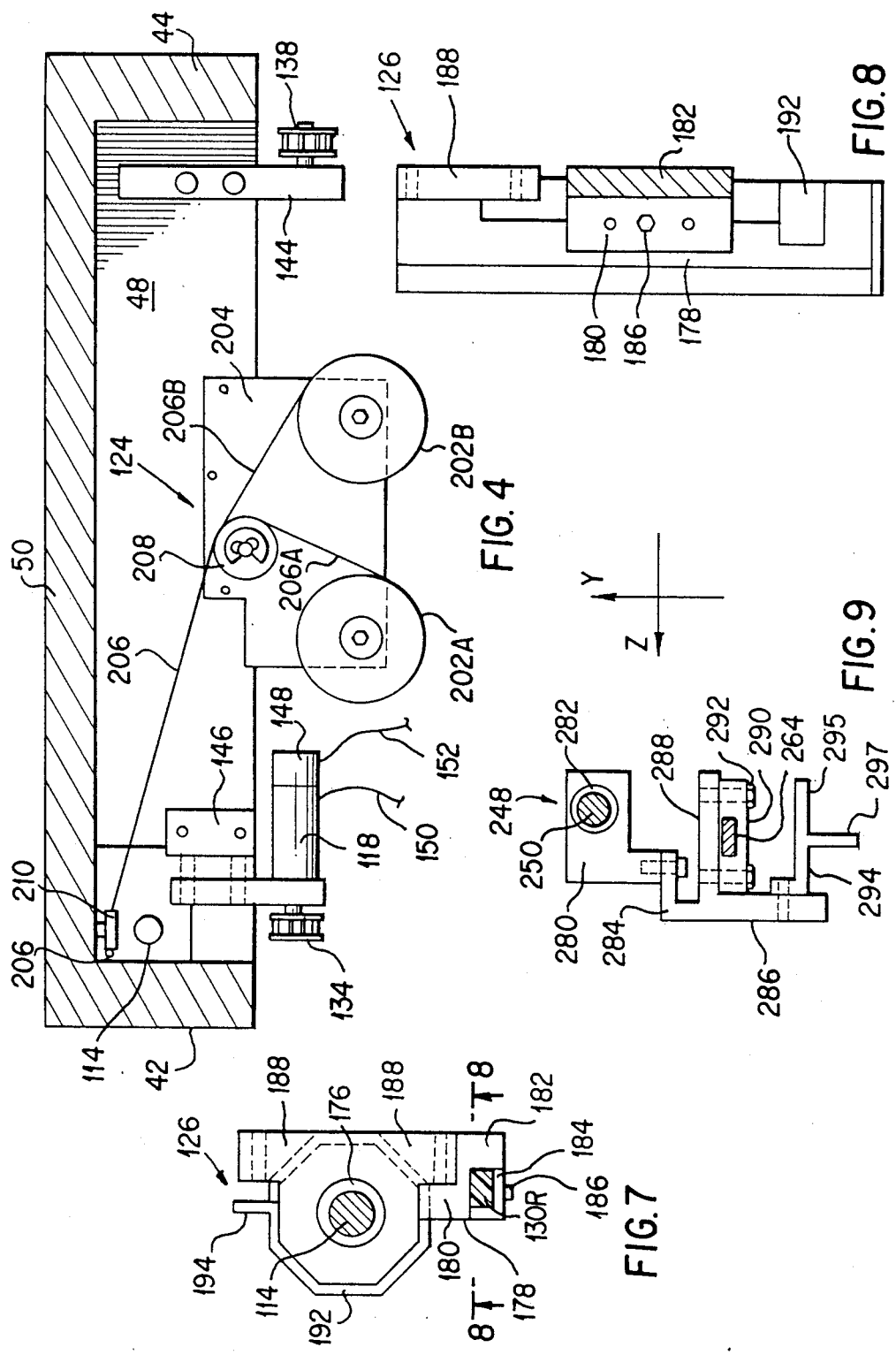
FIG. 4 is a sectional view taken along line 4—4 of FIG. 3.

As shown in FIGS. 3 and 4, the counterbalance system 124 includes two negator spring counterbalance spools 202A and 202B rotatably anchored to plate 204. Plate 204 is in turn secured by fasteners to the interior of door bottom panel 48. Lines 206A and 206B from the spools 202A and 202B, respectively, extend around pulley 208, which is also rotatably anchored to plate 204. From pulley 208 the lines 206 extend around pulleys 210 and 212. As shown in FIG. 3, pulleys 210 and 212 are mounted on the interior of the door right side panel 42, with pulley 210 being near the bottom of panel 42 and pulley 212 being near the top of panel 42. The terminal ends of lines 206 are connected to the Y-carriage 112.

As understood with reference to FIGS. 5–6 and 9, the X displacement system 104 is primarily carried on the Y-carriage 112, and includes an X direction displaceable carriage, also known as X-carriage 248; X-path guide rod 250; and X-drive belt assembly 252; and X-drive motor 254; and, X-direction sensors 256 and 258. The X-path guide rod 250 has opposing ends thereof anchored in opposing side walls 164 and 166 of the Y-carriage 112.

The X-drive belt assembly 252 includes X-belt 264, which is entrained about pulleys 266 and 268. Pulley 268 is rotatably and eccentrically mounted in the bracket 174 secured to the the Y-carriage 112. Pulley 266 is mounted on the output shaft of X-drive motor 254, which in turn is secured by bracket 270 to the Y-carriage 112. X-drive motor 254 also includes a tachometer 274. The X-drive motor 254 is connected by cable 276, and the tachometer connected by cable 278, to circuitry described below.

The shape of X-carriage 248 is best seen in FIG. 9. The X-carriage 248 includes a block-like head portion 280 which has an aperture extending therethrough along the X direction. The aperture is sized to accommodate a nylon or ball bushing 282 and the X-path guide rod 250, so that the X-carriage 248 is slidable along the X-path guide rod 250.

A body portion 284 of the X-carriage 248 has a vertically depending leg member 286 and a vertically extending shoulder 288. The shoulder 288 lies over the upper course of travel of the X-drive belts 264, which is secured under shoulder 288 by clamp 290. Clamp 290 is affixed to shoulder 288 by fasteners 292. Near its distal end, the leg member 286 of X-carriage 248 has interrupt bracket 294 mounted thereto. Interrupt bracket 294 includes a fin 295 (positioned to interrupt beam 296 of the X-sensor 256 at the rightmost extent of permissible X direction travel) and a fin 297 (positioned to interrupt beam 298 of the X-sensor 258 at the leftmost extent of permissible X direction travel). The X-sensor 256 is anchored to Y-carriage front wall 162; the X-sensor 258 is anchored to Y-carriage bottom wall 161.

The Z displacement system 108 is anchored to X-carriage 248, and particularly to the head portion 280 of the X-carriage 248 (although not shown as such in FIGS. 5, 6, and 9). As shown in FIGS. 10–13, the Z displacement system 108 includes a mounting block 308; a Z-frame 310; a Z-path guide rod 312; a Z-drive belt assembly 314; a Z-drive motor 316; and, a Z direction displaceable carriage, also known as Z-carriage 318.

Figure 11:
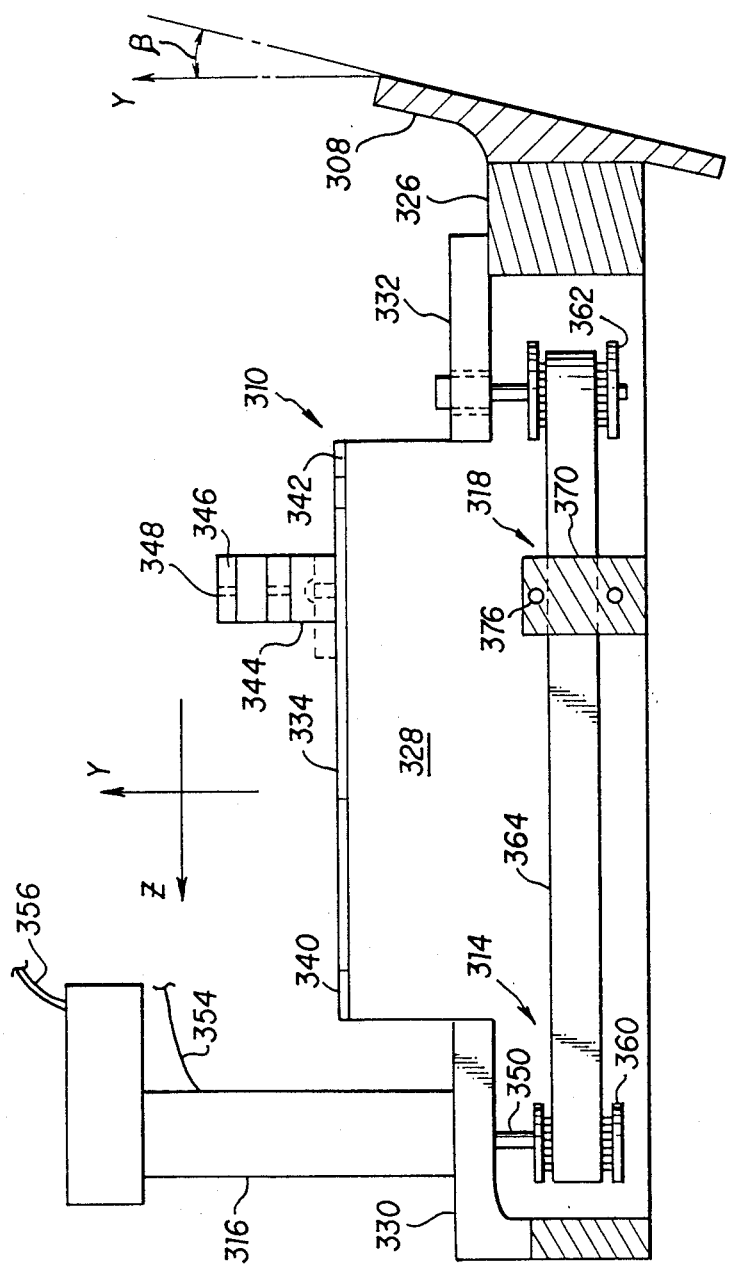
FIG. 11 is a sectional view of a Z-carriage taken along line 11—11 of FIG. 10.
Figures 12, 13:
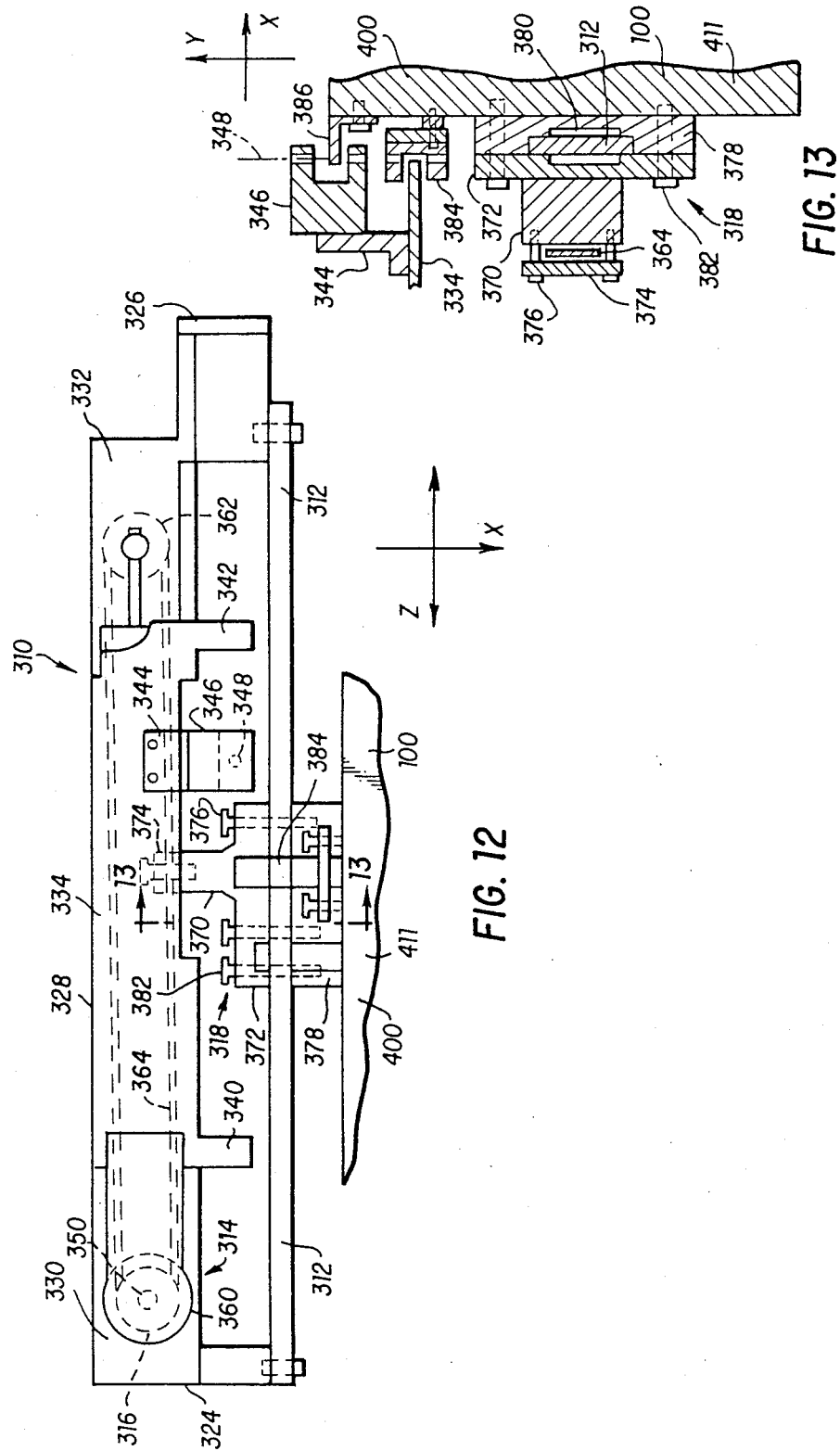
FIG. 12 is a top view of the Z-carriage of FIG. 11.
FIG. 13 is a partial sectional view taken along line 13—13 of FIG. 12.

The Z-frame 310 of the Z displacement system 108 is illustrated in FIGS. 11–13, and includes front panel 324; frame rear panel 326; frame right side panel 328; frame rear top panel 330; frame front top panel 332; and, frame intermediate top panel 334. The frame intermediate top panel 334 is located at a higher altitude (in the sense of the Y direction) than the frame front top panel 332 and the frame rear top panel 330. The Z frame front panel 324 is attached via connector block 308 to the head 280 of the X-carriage 248. As shown in FIG. 11, connector block 308 is configured so that the entire Z frame 310, and the cartridge transport assembly 100 carried thereon, is tilted at angle beta with respect to an XY plane (the same angle beta at which cartridge racks 71 and drives 56 are tilted).

The Z frame intermediate top panel 334 has obstructing limit fingers 340 and 342 extending therefrom in the X direction. As described hereinafter, the fingers 340 and 342 serve to reference the extremes of permissible travel of the cartridge transport assembly 100. The intermediate top panel 334 also has a bracket 344 mounted thereon by fasteners. The bracket 344 carries a Z home sensor 346. As in the manner of other sensors described herein, the Z home sensor 346 is essentially U-shaped, with a central channel or cavity through which a corresponding obstruction element may traverse. A first leg of the Z home sensor 346 has a photoemitter element mounted therein, while a second leg of the Z home sensor 346 has a photodetector element mounted therein in alignment with the photoemitter element, such that an interruptable detection beam 348 is provided.

The Z-drive motor 316 is mounted on the Z frame rear top panel 330 in such a manner that a rotatable output shaft 350 thereof extends through top panel 330 in unhindered fashion. As with the other directional drive motors described herein, the Z-drive motor 316 has an associated tachometer 352. The Z-drive motor 316 is connected by cable 354, and the tachometer 352 is connected by cable 356, to circuitry described below.

The Z-belt drive assembly includes pulleys 360 and 362, about which Z-drive belt 364 is entrained. The pulley 360 is secured to the rotatable output shaft 350 of the Z-drive motor 316. The pulley 362 is rotatably and eccentrically suspended from the Z-frame top front panel 332.

The Z-carriage 318 includes a carriage block 370 having a plate 372 fastened thereon. A right side of the block 370 (seen as the left side from the rear in FIG. 13) contacts the Z-drive belt 364.. The Z-drive belt 364 is sandwiched between the block 370 and a clamp 374. Fasteners 376 securely engage the clamp 374 and Z-drive belt 364 to the block 370, with the result that movement of the Z-drive belt 364 is transmitted to the block 370 and Z-carriage 318.

The Z-carriage 318 includes, in addition to the block 370, a first plate 372, a clamp 374, and a second plate 378. The plates 372 and 378 have interior surfaces facing each other formed to provide a channel 380 through which the Z-path guide bar 312 extends. The interior surfaces of plates 372 and 378 are formed of materials which permit the Z-carriage 318 to travel smoothly on the Z-path guide bar 312. The plates 372 and 378 are clamped together, and fastened to the cartridge transport assembly 100, by fasteners 382.

As shown in FIG. 13, the cartridge transport assembly 100 carries, above plates 372 and 378, a Z overtravel sensor 384. The overtravel sensor 384 is essentially identical to other similar sensors described herein, having a cavity between U-shaped legs. When the cavity is obstructed, a beam between the legs is interrupted and a signal generated. The cavity of the Z overtravel sensor 384 is positioned to be possibly obstructed by either the limit finger 340 or the limit finger 342.

Above and to the side of the Z overtravel sensor 384 on the cartridge transport assembly 100 is a Z home finger 386. The Z home finger 386 is positioned to be interposed in the cavity of the Z home sensor 346 with the cartridge transport assembly 100 is in its "home" or reference position.

From the foregoing description of the X displacement system 104, the Y displacement system 106, and the Z displacement system 108, it is understood that each of the displacement systems 104, 106, and 108, and the cartridge transport assembly 100 (discussed hereinafter in greater detail), are all conveniently mounted on the door 26 of the cartridge library system of the invention. In this regard, the X displacement system 104, including X-carriage 248, is essentially carried on the Y displacement system, particularly on the Y-carriage 112. Moreover, the Z displacement system 108, including Z-carriage 318, is carried on the X-carriage 248. It is the Z-carriage 318 which carries the cartridge transport assembly 100, which will now be described.

STRUCTURE: CARTRIDGE TRANSPORT ASSEMBLY

The cartridge transport assembly 100 comprises a cartridge transport frame 400; cartridge engagement means, particularly cartridge engagement fingers 402A and 402B; cartridge engagement/disengagement actuator means, such as solenoid 404; a cartridge transport linkage system 406; cartridge engagement sensor means 408; and, cartridge abutment sensor means 409. As described hereinafter, the cartridge transport assembly 100 is maneuvered by the operation of the X, Y, and Z displacement systems 104, 106, and 108, respectively, to a coordinate location associated with a requested one of the cartridges in the cartridge library. As the cartridge engagement fingers 402A and 402B of the cartridge transport assembly 100 ride along the cartridge, the cartridge engagement fingers 402A and 402B engage corresponding changer grip notches provided on the standard cartridge. The cartridge engagement fingers 402A and 402B then are self-locked in an engagement orientation (see FIG. 14A). The cartridge transport assembly 100 is then maneuvered to a target drive 56, under the control of the X, Y, and Z displacement systems 104, 106, and 108, respectively. At the target drive 56, the cartridge abutment sensor means 409 detects that the cartridge is in a position to be released. The solenoid 404 is then activated and, via the linkage system 406, causes the cartridge engagement fingers 402A and 402B to rotate to a release or disengagement orientation (see FIG. 14B). Under the control of the X, Y, and Z displacement systems 104, 106, and 108, the cartridge transport assembly 100 then backs away from the target drive 56 and subsequentlly reapproaches along a different trajectory for closing the door 60 of the target drive 56.

As shown in FIG. 10, the center line 410 of cartridge transport frame 400 is parallel with a direction of cartridge approach. As used herein, "direction of cartridge approach" is described as what is seen by the cartridge transport assembly 100, although it is the assembly 100, not the cartridge, that is moving. Then center line 410 lies in a ZY plane, but it tilted from the Z axis by the angle beta in order to properly approach the similarly tilted drives 56 and racks 71.

Figure 14A:
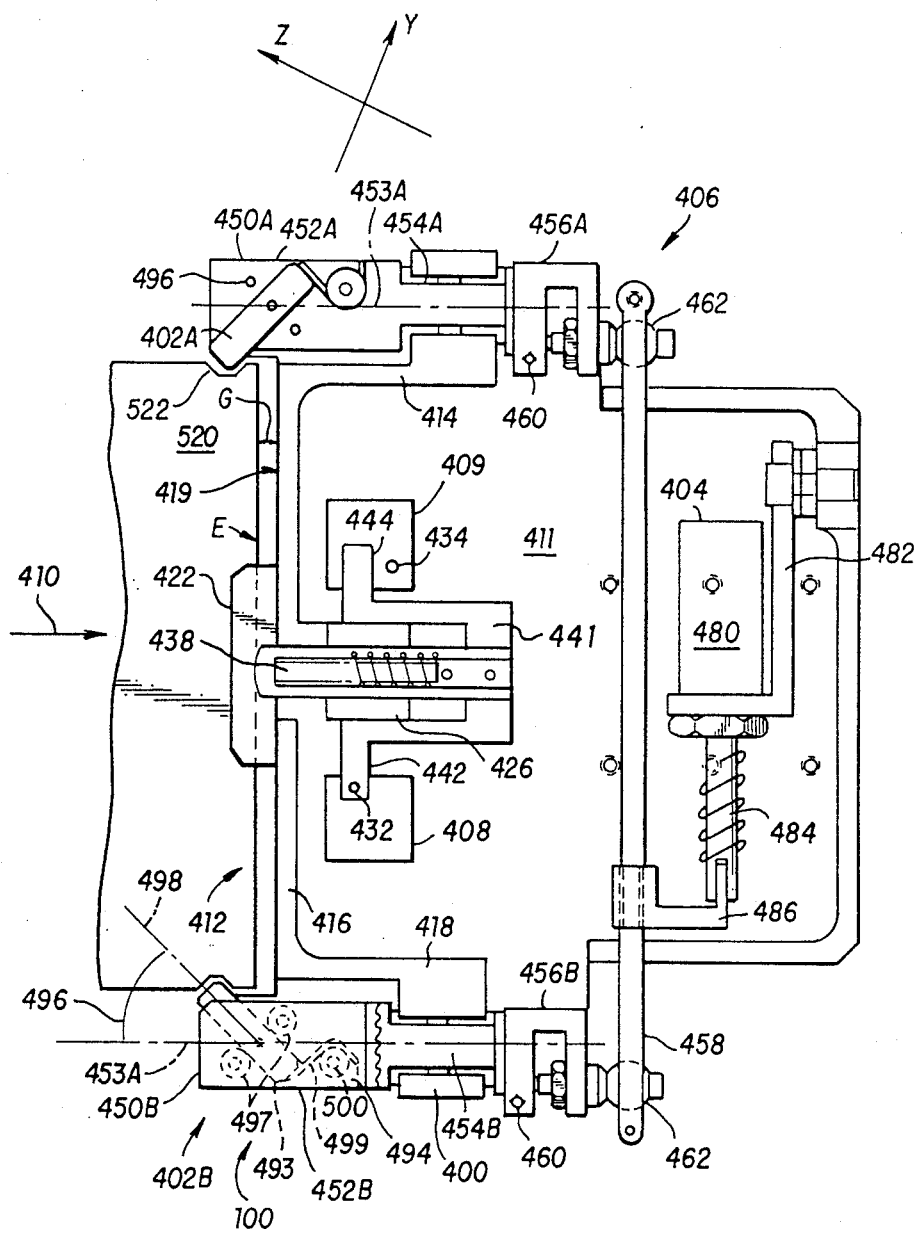
FIG. 14A is a partial side view of a cartridge transport assembly of the embodiment of FIG. 1, with the cartridge transport assembly engaging a cartridge.
Figure 14B:
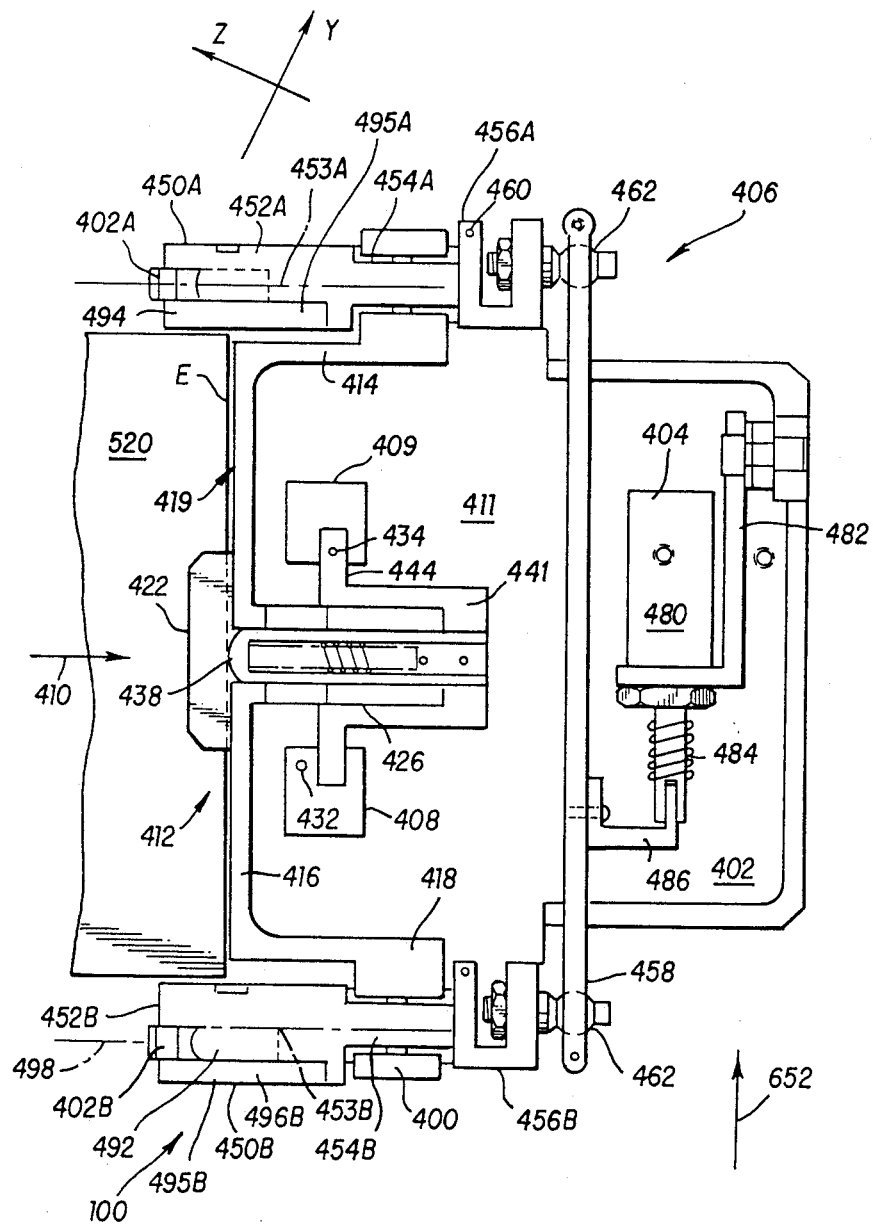
FIG. 14B is a partial side view of a cartridge transport assembly of the embodiment of FIG. 1, with the cartridge transport assembly having just released a cartridge.

The cartridge transport frame 400 comprises a right side panel 411 to which the Z-carriage 318 is affixed by fasteners 382 on the right side thereof. The left face of the right side panel 411 is shown in FIGS. 10, 14A, and 14B, it being remembered that these views are essentially from the rear of the door 26, and thus the left and right directions seem inverted. At its rearmost extent, the frame 400 has a thickened yoke 412, which is integral with the right side panel 411. As seen in FIG. 10, the yoke 412 has an essentially C-shaped cross section in the YZ plane and extends outwardly from the right side panel 402 in the sense of the X direction. The yoke 412 thus comprises upper horizontal yoke leg 414, vertical (central) yoke leg 416, and lower horizontal yoke leg 418. The upper and lower horizontal yoke legs 414 and 418 have mounting blocks 420A and 420B integrally formed thereon, which blocks 420A and 420B face outwardly from the center of the yoke 412. The vertical leg 416 has a cartridge reference surface 419 which is perpendicular to the direction of cartridge approach 410. The width of the yoke 412, particularly the vertical yoke leg 416, as taken in the sense of the X direction, is on the order of the width of a standard magnetic tape cartridge, but just slightly larger in order to accommodate a cartridge between cartridge stabilization flanges 422 integrally provided on the vertical yoke leg 416. The stabilization flanges 422 extend rearwardly from the yoke 412 in the Z direction of approach 410.

The right side panel 411 of the cartridge transport assembly 100 also has mounted on the left face thereof a stationary plunger block 426, and detectors 428 and 430 included in the cartridge engagement sensor means 408 and the cartridge abutment sensor means 409, respectively. These detectors 428 and 430 are of the same U-shaped type described hereinbefore with respect to other detectors, wherein a phototransmitter mounted on one leg directs a beam across a cavity to a photoreceiver mounted on the other leg. In particular, the detector 428 directs a cartridge engagement sensor beam 432, while the detector 430 directs an abutment sensor beam 434.

A spring loaded plunger 438 slidably extends through a central bore in the plunger block 426. A first end of the plunger 438 is capable of extending through an aperture formed in surface 419 of the yoke central vertical leg 416 at a location intermediate the stabilization flanges 422. As described further below, this first end of the plunger 438 contacts an engaged cartridge, with the engagement causing the plunger 438 to be retracted in the approach direction 410 toward the door 26. A second end of the plunger 438 is affixed to travelling interrupter element 441. The travelling interrupter element 441 has two detector blockage fins 442 and 444 mounted thereon. The blockage fins 442 and 444 are so positioned that blockage fin 442 obstructs the engagement sensor beam 432 when a cartridge is engaged by the cartridge transport assembly 100 (the condition shown in FIG. 14A), and blockage fin 444 obstructs the abutment sensor beam 434 when an engaged cartridge experiences pressure by an abutment contacting the cartridge (the condition shown in FIG. 14B).

The cartridge transport linkage system 406 includes a pair of linkage elements known as door rams, particularly upper door ram 450A and lower door ram 450B. Each door ram 450 has an enlarged head portion 452 which, as described more specifically below, is quasi-cylindrical in shape. Each door ram has a cylindrical center axis 453 which is parallel to the direction of the approach 410. Extending frontwardly toward door 26 from each ram head 452 is a reduced diameter neck portion 454 centered on the cylindrical axis 453. The mounting blocks 420 on the transport frame right side panel 411 have apertures and nylon bearings provided therein sized to rotatably accommodate the ram necks 454. The distal ends of the ram necks 454 are connected to first ends of bellcranks 456. The bellcranks 456 are eccentric quasi-cylindrical members having second ends rotatably connected to linear reciprocating linkage shaft 458. The bellcranks 456 are each clamped to the ram neck 454 by fasteners 460. The second ends of the bellcranks 456 are connected to the linear reciprocating linkage shaft 458 via rotatable ball joint 462. The ball joint connection of each bellcrank 456 is off center with respect to the central cylindrical axis 453. As shown in the engagement condition depicted in FIG. 14B, the point of connection of the bellcranks 456 via ball joints 462 is below (with respect to the Y direction) the respective central cylindrical axes 453.

The solenoid 404 has a housing 480 which is carried on an L-shaped bracket 482 mounted on the rear of the carriage transport frame 400. The solenoid 404 has a plunger 484 which extends through an aligned aperture in the bracket 482. A distal end of the plunger 484 is coupled by solenoid yoke member 486 to the linear reciprocating shaft 458. The yoke 486 is U-shaped and has a first side leg secured in a slot of the distal end of the plunger 484 and a second leg fastened to the linear reciprocating shaft 458.

As best seen in FIG. 14B, each ram head 452A, 452B includes a quasi-cylindrical member 492. Member 492 has a chordal section removed therefrom, so that one surface of the member 492 is essentially flat. Each quasi-cylindrical member 492 has a finger guide means provided therein, particularly rectangularly-shaped finger slot 493, as well as a biasing cavity 494. The finger slots 493 have center lines which are oriented at an angle 496 with respect to the center line 453 of the ram head 452, and thus with respect to the direction of cartridge approach 410, when the cartridge transport assembly 100 is in the orientation shown in FIG. 14A. The angle 496 is preferably 45 degrees, The finger slots 493A extend to the exterior of the quasi-cylindrical members 492. A side plate 496A is secured flush against the flat surface of quasi-cylindrical member 492 by fasteners 497 (see FIG. 14A), thereby enclosing the finger slot 493 and the biasing cavity 494.

As shown in FIGS. 14A and 14B, the cartridge engagement fingers 402A, 402B, being essentially rectangular in shape, captively reside in respective finger slots 493A, 493B. The cartridge engagement fingers 402, like the finger slots 493, have central axes 498 which, when in the engagement mode as shown in FIG. 14A, are oriented at the angle 496 with respect to the direction of cartridge approach 410. Each cartridge engagement finger 402 has a first end thereof which extends beyond its associated quasi-cylindrical member 492. A second end of each cartridge engagement finger 402 has biasing means bearing thereagainst, particularly torsion spring 499. Torsion spring 499 is coiled around a post 500 sandwiched in biasing cavity 494 between the quasi-cylindrical member 492 and the side plate 496.

The configuration of a cartridge engagement finger 402 is illustrated with reference to FIG. 17A. Each cartridge engagement finger 402 has the following surfaces formed at its first end (i.e. the end that protrudes out of the quasi-cylindrical member 492): finger first surface 510; finger second surface 512; finger third surface 514; and, finger fourth surface 516. The first and second surfaces 510 and 512 are opposing planar surfaces and are both parallel to the finger axis 498 (and thus to the slot axis). Accordingly, surfaces 510 and 512 are oriented at the angle 496 with respect to the direction of cartridge approach 410. The finger third surface 514 is perpendicular to both the finger first surface 510 and the finger second surface 512. The finger fourth surface 516 is oriented at 45 degrees with respect to both the finger first surface 510 and the finger third surface 514, and is intermediate the surfaces 510 and 514. The finger first surface 510 is contiguous with the finger fourth surface 516; the finger fourth surface 516 is contiguous with the finger third surface 514; and, the finger third surface 514 is contiguous with the finger second surface 510.

Figure 17A:
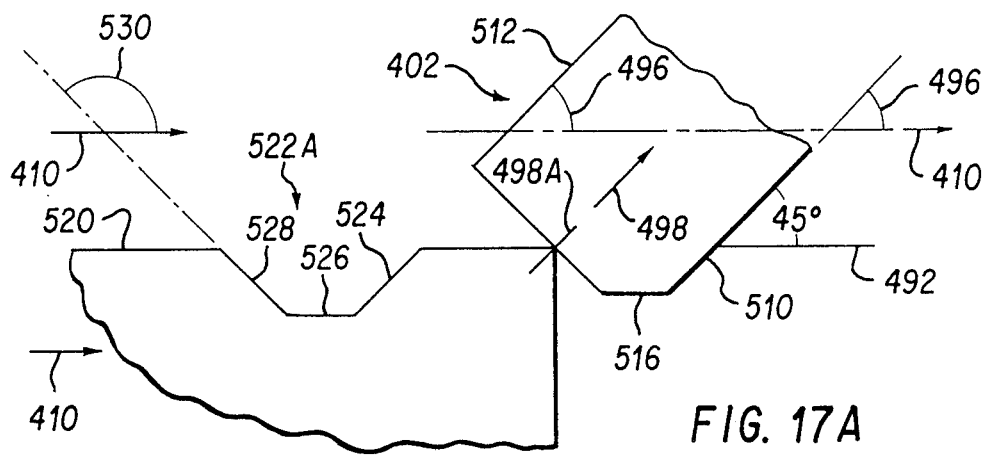
FIGS. 17A–17E are schematic views showing sequential steps involved in the engagement and disengagement of a cartridge by cartridge engagement fingers included in the cartridge library system of the embodiment of FIG. 1.

FIG. 17A also shows a portion of a standard 8 mm magnetic tape cartridge 520. The standard magnetic tape cartridge 520 is provided with a pair of changer grip notches 522, which are spaced from the rear of the cartridge by about 0.2 inches. Each cartridge notch 522 has three surfaces: cartridge notch first surface 524;

cartridge notch second surface 526; and, cartridge notch third surface 528. The cartridge notch first surface 524 is oriented at the angle 496 with respect to the direction of cartridge approach 410; the cartridge notch third surface 528 is oriented at an angle 530. As mentioned before, angle 496 is 45 degrees; angle 530 is 135 degrees. The cassette notch second surface 526 is parallel with the direction of cartridge approach 410. The length of finger fourth surface 516 as shown in FIG. 17A corresponds with the length of the cartridge notch second surface 526, which is on the order of about 0.048 inch.

STRUCTURE: CONTROLLER COMPUTER AND ELECTRONICS

The LC computer 22 includes a circuit board housing 550; a CRT monitor 552; and, a keyboard 554. In the illustrated embodiment, the LC computer 22 is a type manufactured by Joy Systems as model JS 286. Although unillustrated, it is well understood that the circuit board housing of the LC computer 22 includes a microprocessor; on-board memory; and, a plurality of card slots. The unillustrated memory included in the LC computer 22 has stored therein, among other things, a look-up table containing the X, Y, and Z coordinates of each of the 120 cartridge cells of the racks 70 forming the library, as well as the X, Y, and Z coordinates of the cartridge cells of each of the tape drives 56A-56E.

Figure 16:
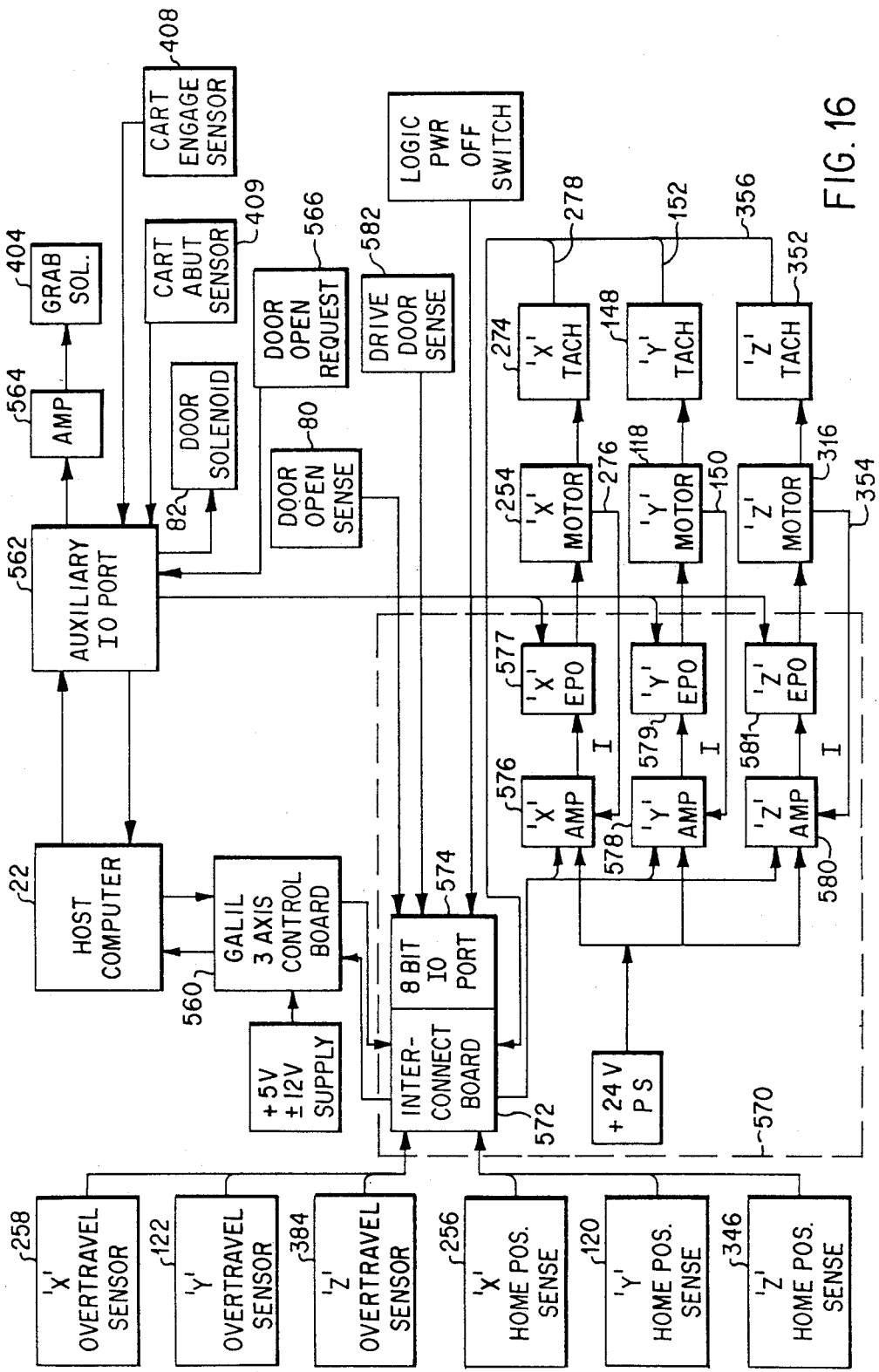
FIG. 16 is a schematic view of electronic circuitry included in the cartridge library system of the embodiment of FIG. 1.

FIG. 16 is a schematic illustration of electronics associated with the cartridge library system under discussion. FIG. 16 shows not only the LC computer 22 generally, but also indicates by means of block 560 a certain card plugged into a card slot of the backplane of the LC computer 22. Block 560 represents a three axis control card which receives signals from the cartridge library system and which sends signals to the cartridge library system for controlling the X, Y, and Z displacement systems 104, 106, and 108, respectively. In the illustrated embodiment, the three axis control block represented by block 560 is provided by Galil Motion Control, Inc., as model DMC 630, the operation of which is understandable from the DMC-600 Series User Manual.

The LC computer 22 also includes an auxiliary I/O port, through which the LC computer 22 communicates with the cartridge grab solenoid 404 (via amplifier 564); with the cartridge engagement sensor 408; with the cartridge abutment sensor 409; with the door lock solenoid 82; and, with a door open request button 566 provided on the exterior of the door 26.

FIG. 16 also depicts elements included on the circuit board mounting shelf 55, which elements are framed by broken line 570 in FIG. 16. These elements include an interconnect board 572 and an associated 8 bit I/O port 574; connections to the X motor 254 (via amplifier 576 and emergency power off [EPO] device 577); connections to the Y motor 118 (via amplifier 578 and emergency power off [EPO] device 579); and, connections to the Z motor 316 (via amplifier 580 and emergency power off (EPO) device 581.

The 8 bit I/O port 574 is connected to receive signals from the tachometers 274, 148, and 352; from the door open sensor 80; and, from a drive door sensor 582. The drive door sensor 582 is included as a component of each drive 56, it being understood that five such drive door sensors 582A-582E are provided.

The interconnect board 572 is provided by Galil Motion Control, Inc., in conjunction with model DMC 630. The interconnect board 572 is connected to receive signals from the Y home position sensor 120 and the Y overtravel sensor 122; from the X home position sensor 256 and the X overtravel sensor 258; and, from the Z home position sensor 346 and the Z overtravel sensor 384.

OPERATION

Figure 19A:
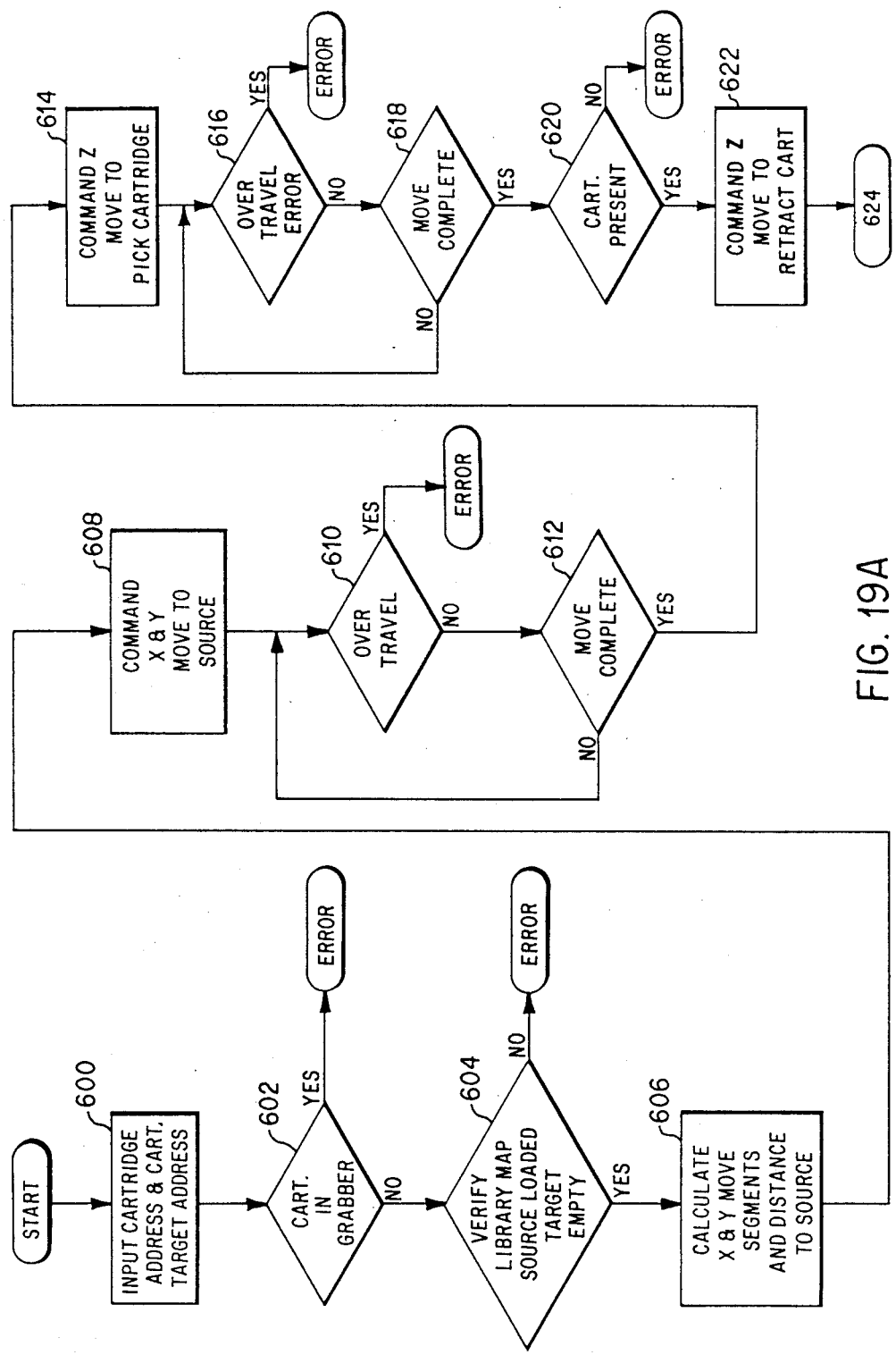
FIGS. 19A–19C are schematic views showing operating steps executed by the cartridge library system of the embodiment of FIG. 1 in transporting a cartridge from a source cell to a target drive.
Figure 19B:
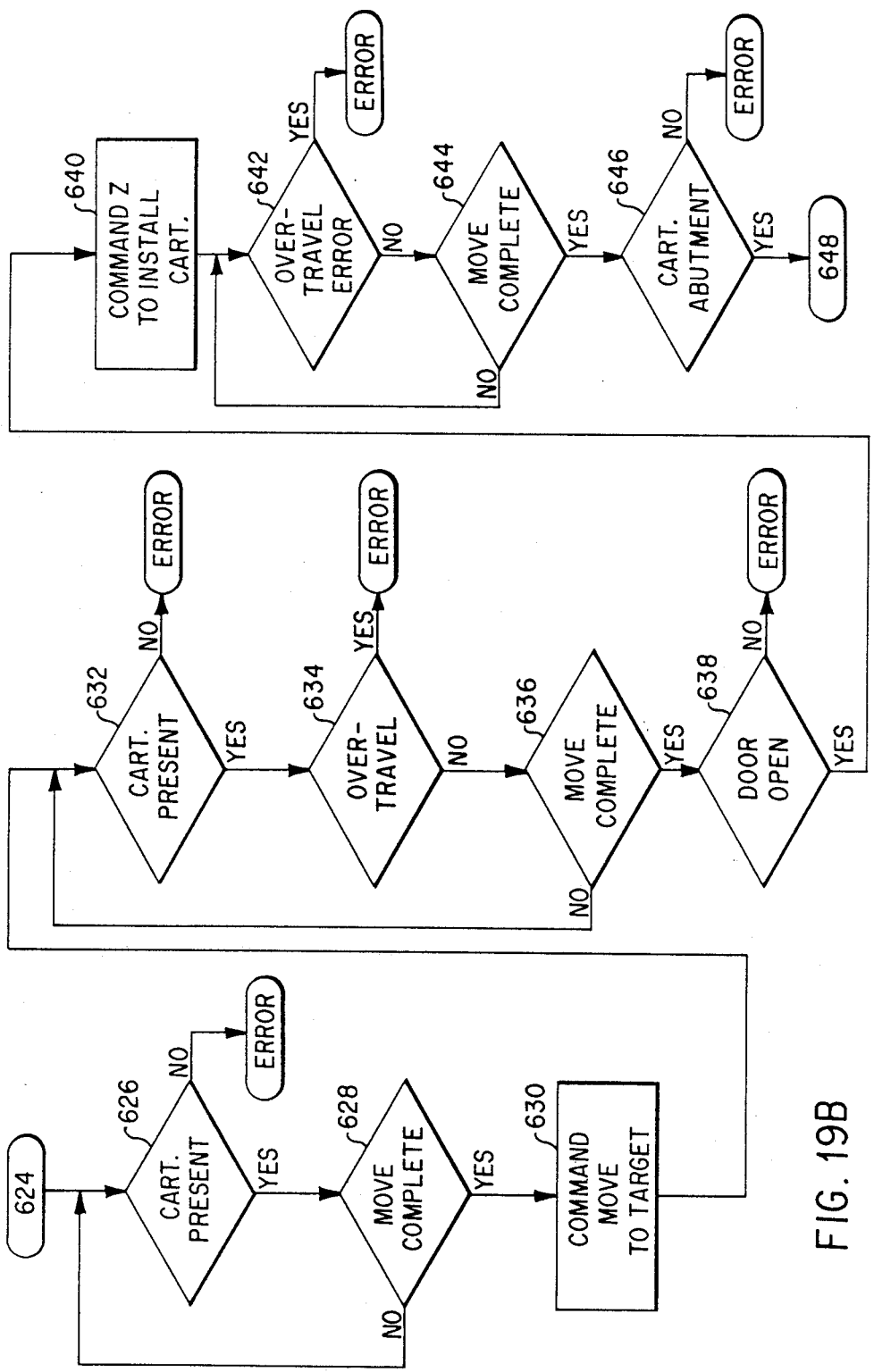
Figure 19C:
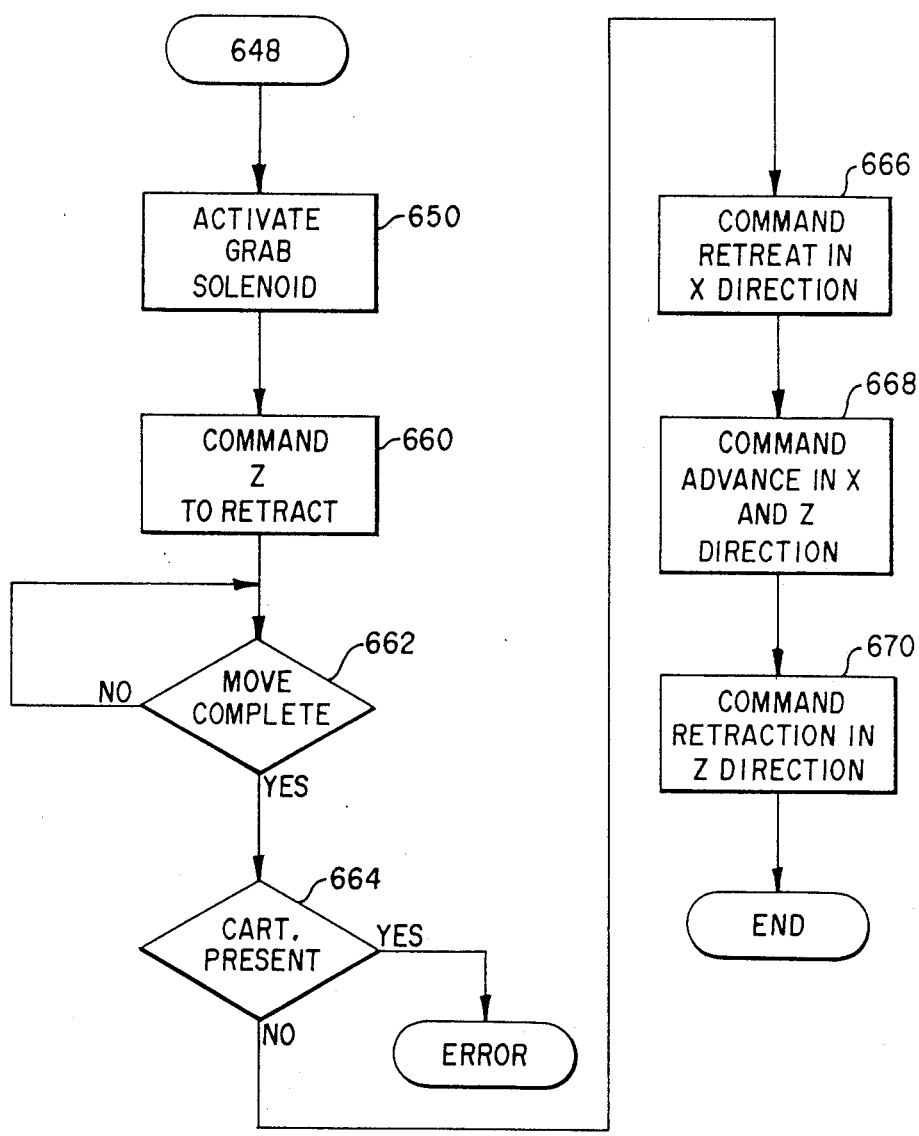

FIGS. 19A-19C show steps executed by the cartridge library system of the invention in engaging a cartridge 520 from a source cell (in one of the racks 70 provided on wall 51 of the library system), and transporting that cartridge 520 to a target tape drive 56. From the ensuing discussion it should also be understood how the cartridge transport assembly 100 of the library transports cartridges from one non-drive cell to another; and from a drive 56 to a target non-drive cell included in one of the racks 70.

In order to fetch a cartridge from a source cell, the X, Y, and Z coordinates of the source cell must be obtained from the library map stored in the memory of the LC computer 22. Likewise, the X, Y, and Z coordinates of the target cell for the cartridge must also be obtained from the library map. At step 600 (see FIG. 19A) these coordinates are transferred to the electronic three axis control board 560.

At step 602 the LC computer 22 checks to determine if a cartridge is presently engaged by the cartridge transport assembly 100. If the result of the check at step 602 is positive, an error message is generated. At step 604 the LC computer 22 checks to determine if the target cell is already occupied. This is done by checking the condition of the signal received from the drive door sensor 582, which is included in the target drive 56. An error message is generated if the target drive 56 is already occupied.

At step 606 the three axis control board 560 calculates the X and Y components of travel required for the cartridge transport assembly 100 to reach the selected source cell. At step 608 the three axis control board 560, via the interconnect board 572 and amplifiers 576 and 578, send signals to the X-drive motor 254 and to the Y-drive motor 118, respectively, so that the cartridge transport assembly 100 is maneuvered to appropriate X and Y coordinates of the source cell. In this respect, the signals to the Y-drive motor 118 cause the Y-drive belt assembly 116 to displace the Y-carriage 112 to the proper Y coordinate for the source cell. Likewise, the signals to the X-drive motor 254 cause the X-drive belt assembly 252 to displace the X-carriage 248 to the proper X coordinate for the source cell. The three axis control board 560 keeps abreast of the degree of motion of the X and Y displacement systems 104 and 106, respectively, by the tach signals received from respective tachometers 274 and 148.

Step 610 reflects the fact that any overtravel by the X-carriage 248 or the Y-carriage 112 during step 608 results in ah interrupt and an error message. That is, should the X-carriage 248 travel so far that fin 297 carried thereon interrupts beam 298 of sensor 258, the sensor 258 generates an electronic interrupt which results in an error message. Alternatively, should the Y-carriage 112 travel so far that the member 194 carried on the Y carriage interface element 126 interrupts the sensor 122, the sensor 122 generates a signal which ultimately results in an error message.

At step 612 the three axis board 560 determines whether the requested travel for the cartridge transport assembly 100 in the X and Y directions has been completed. As mentioned above, the three axis board 560 knows this through the monitoring of the X and Y tachometers 274 and 148, respectively. If the requested move along the X and Y axes is not yet complete, execution continues in loop fashion until it is determined that the move is complete.

At step 614 the three axis control board 560, via the interconnect board 572 and amplifier 580, send signals to the Z-drive motor 316 so that the cartridge transport assembly 100 is maneuvered to appropriate Z coordinate of the source cell. In this respect, the signals to the Z-drive motor 316 cause the Z-drive belt assembly 314 to displace the Z-carriage 318 to the proper Z coordinate for the source cell.

Step 616 reflects the fact that any overtravel by the Z-carriage 318 during step 614 results in an interrupt and an error message. That is, should the Z-carriage 318 travel so far that limit fingers 340 or 342 interrupt the beam of sensor 384, the sensor 384 generates an electronic interrupt which results in an error message.

At step 618 the three axis board 560 determines whether the requested travel for the cartridge transport assembly 100 in the Z direction has been completed. As mentioned above, the three axis board 560 knows this through the monitoring Z tachometer 352. If the requested move along the Z axis is not yet complete, execution continues in loop fashion until it is determined that the move is complete.

Figure 17B:
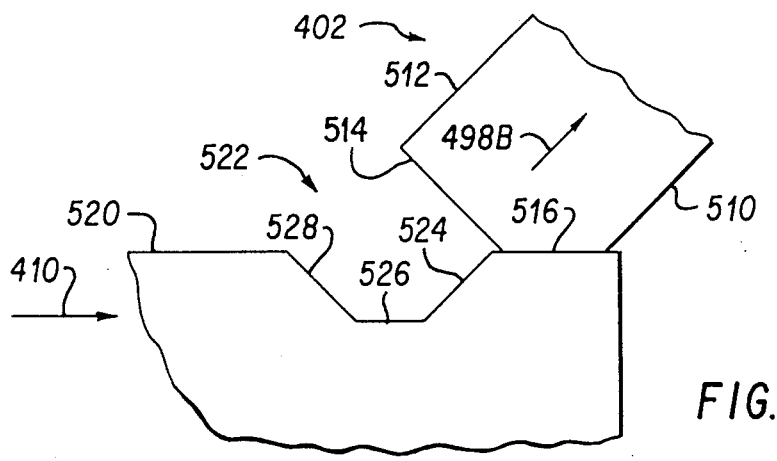
Figure 17C:
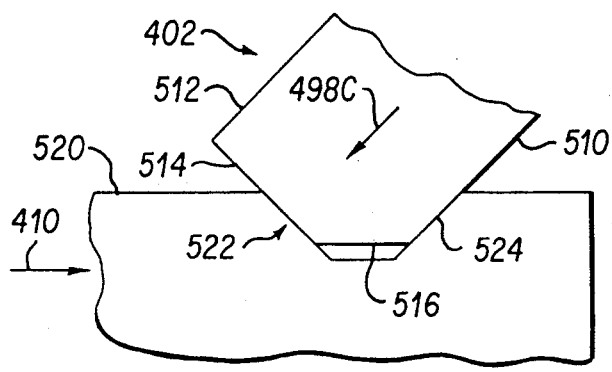

By the time that the move of the cartridge transport assembly 100 is complete in the Z direction, the conditions depicted in FIGS. 17A through 17C will have occurred. In this regard, as the cartridge transport assembly 100 travels toward the cartridge in the source cell, the cartridge transport assembly 100 sees the cartridge approaching in the direction depicted as arrow 410 (see FIGS. 10, 14A, and 17A).

Initial contact of one of the engagement fingers 402 is shown in FIG. 17A, wherein the finger third surface 514 strikes an edge of the approaching cartridge. As the approach of the cartridge continues along direction 410, the edge of the cartridge exerts a force in direction 410 against the engagement finger 402. Although the engagement finger 402 is resiliently biased against the cartridge, the force exerted by the cartridge overcomes the finger bias, so that the engagement finger 402 begins to move along the guide slot 493 in the direction shown by arrow 498A in FIG. 17A. Simultaneously, the finger third surface 514 rides higher and higher on the cartridge edge.

As the cartridge continues to approach as shown in FIG. 17B, the retraction of the engagement finger 402 occurs to such a degree that the finger third surface 514 rides sufficiently high that the finger fourth surface 516 starts to ride on the cartridge edge. While the finger fourth surface 516 rides on the cartridge in this manner, the cartridge maintains its force on the engagement finger 402.

When the intersection of the finger first and fourth surfaces 510 and 516 reach the cartridge notch first surface 524, the resilient bias of the engagement finger 402 (afforded by the torsion spring 499) exerts a force (shown by arrow 498C) which drives the engagement finger down into the cartridge changer grip notch 522 as shown in FIG. 17C. At this juncture, the finger first surface 510 is flush against the cartridge notch first surface 524, and the finger thus surface 514 is flush against the cartridge notch third surface 528. The flush contact of these surfaces causes secure engagement of the finger 402 with the cartridge. The cartridge is essentially locked between the fingers 402A and 402B without the need of further locking mechanisms. In this regard, as understood with reference to FIG. 17D, should the cartridge be jarred or displaced further along the direction 410, the finger 402 remains inserted in the cartridge notch 522.

FIG. 14A shows the appearance of the cartridge transport assembly 100 when a cartridge is engaged betweeen engagement fingers 402 in the stage described in FIG. 17C. Upon engagement of the cartridge between the fingers 402, a small gap G exists between a foremost edge E of the cartridge and the cartridge reference surface 419 provided on the cartridge transport assembly 100. The edge E of the cartridge bears against the plunger 438, with the result that the plunger 438 is retracted to such an extent that the blockage fin 442 of the travelling interrupter element 441 obstructs beam 432 of the cartridge engagement sensor 408.

Returning to FIG. 19A, at step 620 a check is made to determine whether the cartridge engagement sensor 408 is sending a signal indicative of the engagement of a cartridge in the aforedescribed manner. If, at this juncture, such a signal is not received from the cartridge engagement sensor 408, an error message is generated.

Assuming that a cartridge has been successfully engaged between the fingers 402 of the cartridge transport assembly 100 in the manner described above, at step 622 the three axis control board 560 directs the cartridge transport assembly 100 to return to its "home" position. In this regard, the control board 560 sends signals to the Z motor 316 (in the manner described above) so that the Z-carriage 318 returns to its home position.

As the Z-carriage 318 of the cartridge transport assembly 100 returns home, the signal from the cartridge engagement sensor 408 is continually monitored (as reflected by step 626) to ensure that the cartridge is still engaged between the fingers 402. When the three axis control board 560 determines that Z-carriage 318 has finally returned home (at step 628), the board 560, knowing the X, Y, Z coordinates of the target drive 56, directs the cartridge transport assembly 100 with the cartridge engaged thereby to move to the target drive 56 (step 630).

The movement of the cartridge transport assembly 100 along the X and Y axes involves execution of steps 634 and 636, which are understood with reference to the earlier discussion of steps 610 and 612. Additionally, step 632 reflects the fact that the presence of the cartridge between the engagement fingers 402 is constantly monitored in the fashion described above with reference to step 626.

After the cartridge transport assembly 100 has reached the X and Y coordinates of the target drive 56, a check is again made to ensure that the drive door 60 is opened (step 638). If the drive door 60 is open, the three axis control board 560 directs the Z-carriage 318 to move toward the target drive (step 640, see also FIG. 18A).

As the Z-carriage 318 moves toward the target drive 56, checks are continually made that the Z-carriage does not overtravel (step 642). Overtravel would occur if the overtravel sensor 384 were to be interrupted by the limit finger 340 (see FIGS. 12 and 13). Movement of the Z-carriage with the cartridge transport assembly 100 mounted thereon continues until the three axis control board 560 determines that travel is completed (step 644).

When the cartridge carried by the cartridge transport assembly 100 reaches the target drive (as determined in step 644), contact by the cartridge with the cartridge-receiving cell 58 of the drive 56 (see FIG. 18B) causes the cartridge to exert a further force in the direction of arrow 410 against the cartridge transport assembly 100. This exertion of further force causes the cartridge 520 and the cartridge transport assembly 100 to assume the relative positions shown in FIG. 14B. In particular, the edge E of the cartridge 520 is pressed directly against the cartridge reference surface 419, so that the gap G is eliminated and the plunger 438 is further retracted in the direction of arrow 410.

Figure 17D:
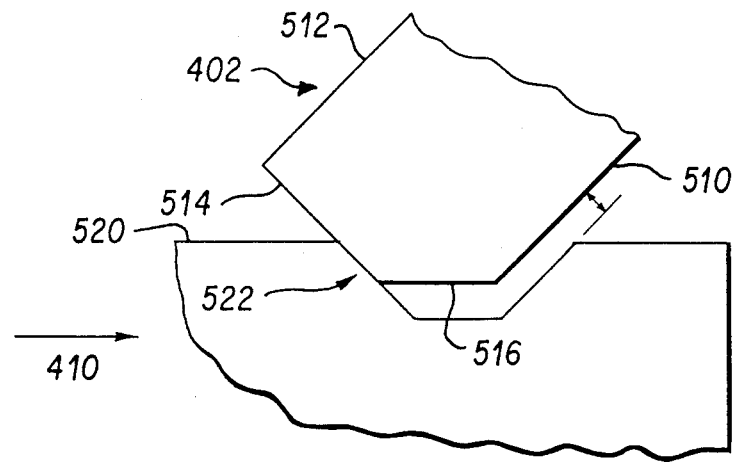

The relative positions of the engagement finger 402 and the cartridge notch 522 at this juncture are shown in FIG. 17D. FIG. 17D shows that the additional force exerted in the direction of arrow 410 causes the finger third surface 514 to ride up a predetermined amount on the notch third surface 522, the predetermined amount being such that the finger third surface 514 still contacts, and hence the finger 402 remains inserted in, the cartridge notch 522. Since the cartridge edge E is, at this juncture, flush against the cartridge reference surface 419, the finger third surface 514 cannot ride any higher on the notch third surface 522 than is shown in FIG. 17D, since the cartridge 520 cannot advance any further in the direction depicted by arrow 410.

The retraction of the plunger 438 as pictured in FIG. 14B causes the blockage fin 444 carried by the travelling interupter element 441 to interrupt the beam 434 of the cartridge abutment sensor 409. Thus, the sensor 409 serves to detect a change of a predetermined magnitude in the size of the gap G. The sensor 409 generates a signal, indicative of interruption, to the LC computer 22. The LC computer 22 monitors for this signal and, when the signal is received (step 646), sends a signal to the solenoid 404 (step 650) so that the cartridge transport assembly 402 will release the cartridge 520.

Figure 17E:
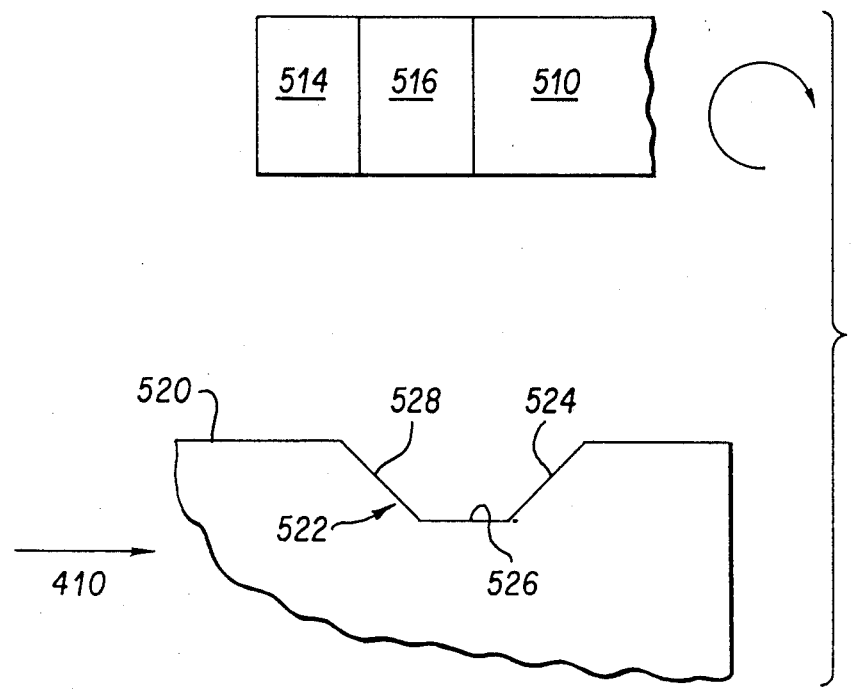

The manner in which the cartridge 520 is released from the cartridge transport assembly 100 is also understood with reference to FIG. 14B. When activated at step 650, the solenoid 404 retracts its plunger 484. Retraction of the plunger 484 causes the linearly reciprocating linkage shaft 458 to reciprocate linearly in the direction shown by arrow 652. Movement of the shaft 458 in the direction of arrow 652 occasions rotation of the eccentric bellcranks 456A and 456B. Rotation of the bellcranks 456 requires also the rotation of the door rams 450 included in the linkage assembly. Thus, the door rams 450 rotate about their center lines 453, with the result that the engagement fingers 402 rotate out of the cartridge notches 522 in the manner shown in FIG. 17E.

After the cartridge 520 is released from the cartridge transport assembly 100 and into the target drive 56 in the aforedescribed manner at step 650, the three axis control board 560 directs the cartridge transport assembly 100 to close the door 60 for the target drive 56. In this regard, at step 660 the board 560 directs the cartridge transport assembly 100 to return to its "home" Z position (see FIG. 18C) and waits until it determines that the return is complete (step 662). A check is made at step 664 to determine if a cartridge is still untimely engaged by the cartridge transport assembly 100. This is accomplished by checking the status of the signal from the cartridge engagement sensor 408.

After the cartridge transport assembly 100 has returned to its Z "home" position, at step 666 the three axis control board 560 directs the X-carriage 248 to retreat a slight amount along the X direction, i.e. to move slightly rightward as shown in FIGS. 1 and 18D. Thereafter, at step 668, as shown in FIG. 18E, the three axis control board 560 directs the cartridge transport assembly 100 to advance predetermined amounts in the X and Z directions, so that the ram heads 452 of the door rams 450 contact the drive door 60. After contact, continued predetermined advancement of the door rams 450 in the X and Z direction (shown in FIG. 18F) eventually close the drive door 60 (see FIG. 18G). After the door 60 is closed, the three axis control board 560 directs the cartridge transport assembly 100 to again retract to the Z home position (step 670) in a manner understood in light of the foregoing discussion.

It should be understood that in the aforedescribed steps 66, 668, and 670, any overtravel detected by the sensors 258 and 384 would result in error messages upon such overtravel.

From the foregoing discussion it is also understood how the cartridge transport assembly 100 can move a cartridge 520 from a cell of one rack 70 to another cell of another rack, or from a source tape drive 56 to a target cell in a rack 70.

Advantageously, the automated library system of the invention locates the X, Y, and Z displacement systems 104, 106, and 108 for the cartridge transport assembly 100 on the door 26. The door 26 is both removable and pivotal with respect to the cabinet 24, with the result that access to the cartridge transport assembly 100 and the X, Y, and Z displacement systems is easily gained. Moreover, the door 26 is modularly replaceable by merely disconnecting electrical cables to the various sensors, motors, and tachometers, and by dismounting the door 26 from cabinet 24 at hinges 28. Further, should the library system be disabled, access to the library system is easily obtained via door 26 for manual retrieval and loading of cartridges.

The cabinet 24 of the library system compactly and strategically organizes cartridge racks 70 and drives 56. The racks 70 and drives 56 are oriented at the angle beta, so that a component of gravitational force is exerted on the cartridges as they are loaded into the cells (whether the cell be associated with a rack 70 or a drive 56). The organization of the cabinet 24 permits all cartridges stored therein to be available to all of the drives 56A-56E, overcoming limitations in some prior art libraries which require that certain units of storage medium be specially dedicated for certain peripherals.

The cartridge transport assembly 100 advantageously includes the engagement fingers 402A, 402B, which not only engage cartridges 520, but lock the cartridges 520 between the fingers 402A, 402B without the requirement for additional locking structure. Moreover, the engagement fingers 402A, 402B are carried by door rams 450A, 450B, which dually serve both as linkage members for disengaging the fingers 402A, 402B and as rams for closing the door 60 of a tape drive 56.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. Apparatus for engaging and disengaging a cartridge of magnetic tape and for transporting said cartridge from a first location to a second location, said apparatus comprising:

frame means including a cartridge reference surface;

a pair of engagement fingers carried on said frame means, said engagement fingers being configured upon engagement to extend into changer grip notches provided on a cartridge and to remain at least partially extended therein after engagement despite further travel by said cartridge in a direction of cartridge approach to said frame means, said engagement fingers being carried on said frame at a position whereby, when said engagement fingers engage said changer grip notches, a gap exists between said cartridge and said cartridge reference surface;

means for urging said engagement fingers into said changer grip notches provided on said cartridge as said cartridge approaches said frame means in said direction of cartridge approach;

means mounted on said frame means for detecting when said cartridge is in a position to be disengaged from between said engagement fingers, said detecting means comprising means for detecting a change in the size of said gap between said cartridge and said cartridge reference surface; and, means responsive to said detecting means for withdrawing said engagement fingers from said changer grip notches.

2. The apparatus of claim 1, wherein said cartridge reference surface is essentially perpendicular to said direction of cartridge approach to said frame means.

3. The apparatus of claim 2, wherein said means for detecting when said cartridge is in a position to be disengaged from between said engagement fingers comprises means for detecting a change of a predetermined magnitude in the size of said gap between said cartridge and said cartridge reference surface.

4. The apparatus of claim 1, wherein said means for detecting a change in the size of said gap comprises displaceable plunger means contactable by said cartridge.

5. The apparatus of claim 4, wherein said plunger means extends through an aperture in said cartridge reference surface of said frame means.

6. The apparatus of claim 1, wherein said means for withdrawing said engagement fingers from said changer grip notches comprises means for rotating each of said engagement fingers about an axis parallel to said direction of cartridge approach.

7. The apparatus of claim 6, wherein said means for withdrawing said engagement fingers from said changer grip notches further comprises:

actuator means responsive to said detecting means;

linkage means connected to said actuator means and responsive thereto for rotating said engagement fingers between an engagement position and disengagement position.

8. The apparatus of claim 7, wherein said actuator means has a linearly displaceable output shaft, and wherein said linkage means includes means for converting said linear displacement of said output shaft into rotational motion.

9. The apparatus of claim 7, wherein said linkage means includes a linkage member having a major axis essentially parallel to said direction of cartridge approach, wherein said linkage member has guide means provided therein, said guide means having an axis which defines a direction of travel of said engagement finger, said engagement finger being at least partially contained in said guide means.

10. The apparatus of claim 9, wherein said axis of said guide means is at an angle of about 45 degrees with respect to said direction of cartridge approach.

11. The apparatus of claim 9, wherein at least one of said engagement fingers is carried on ram means provided for closing a tape drive door.

12. The apparatus of claim 9, wherein said means for urging at least one of said engagement fingers is provided on said linkage member.

13. The apparatus of claim 9, wherein two such linkage members are provided, and wherein said linkage members are essentially cylindrical members having a central axis substantially parallel to said direction of cartridge approach.

14. The apparatus of claim 1, wherein at least one of said engagement fingers is carried on ram means provided for closing a tape drive door.

15. The apparatus of claim 14, wherein said ram means has a major axis essentially parallel to said direction of cartridge approach, wherein said ram means has guide means provided therein, said guide means having an axis which defines a direction of travel of said engagement finger, said engagement finger being at least partially contained in said guide means.

16. The apparatus of claim 15, wherein said means for urging at least one of said engagement fingers is provided on said ram means.

17. The apparatus of claim 15, wherein two ram members are provided, and wherein said ram members are essentially cylindrical members having a central axis substantially parallel to said direction of cartridge approach.

18. Apparatus for engaging and disengaging a cartridge of magnetic tape upon which information is storable and for transporting said cartridge from a first location to a second location, said apparatus comprising:

frame means;

a pair of engagement fingers carried on said frame means, said engagement fingers being configured upon engagement to extend into change grip notches provided on a cartridge, each of said engagement fingers being at least partially contained in respective guide means provided on said frame means, said guide means having an axis which defines a direction of travel for its respective engagement finger, said axis of each of said guide means being about 45 degrees with respect to a direction of cartridge approach;

means for urging said pair of engagement fingers into said changer grip notches provided on said cartridge as said cartridge approaches said frame means in said direction of cartridge approach;

means for detecting when said cartridge is in a position to be disengaged from between said engagement fingers;

means responsive to said detecting means for withdrawing said engagement fingers from said changer grip notches.

19. The apparatus of claim 18, wherein said engagement fingers have opposing first and second planar surfaces which are both parallel to said axis of said guide means, a third planar surface which is perpendicular to said first and second planar surfaces, and a fourth surface which is oriented at a 45 degree angle with respect to said axis of said guide means.

20. The apparatus of claim 19, wherein said first surface is contiguous with said fourth surface, said fourth surface is contiguous with said third surface, and said third surface is contiguous with said second surface.

21. The apparatus of claim 18, wherein said means for withdrawing said engagement fingers from said changer grip notches comprises means for rotating each of said engagement fingers about an axis parallel to said direction of cartridge approach.

22. The apparatus of claim 18, wherein said means for withdrawing said engagement fingers from said changer grip notches further comprises:
  actuator means responsive to said detecting means;
  linkage means connected to said actuator means and responsive thereto for rotating said engagement fingers between an engagement position and disengagement position.

23. The apparatus of claim 18, wherein said linkage means comprises two linkage members, and wherein said engagement fingers are carried on respective ones of said linkage members.

24. The apparatus of claim 18, wherein said means for urging said engagement fingers into said changer grip notches of said cartridge comprise resilient biasing means.

25. The apparatus of claim 18, wherein at least one of said engagement fingers is carried on ram means provided for closing a tape drive door.

26. Apparatus for engaging and disengaging a cartridge of magnetic tape upon which information is storable and for transporting said cartridge from a first location to a second location, said apparatus comprising:
  frame means;
  a pair of engagement fingers carried on said frame means, said engagement fingers being configured upon engagement to extend into changer grip notches provided on a cartridge, each of said engagement fingers being carried by said frame means in a manner whereby said engagement fingers are extendable along a direction of finger travel, said direction of finger travel being about 45 degrees with respect to a direction of cartridge approach;
  means for urging said pair of engagement fingers into said changer grip notches provided on said cartridge as said cartridge approaches said frame means in said direction of cartridge approach;
  means for detecting when said cartridge is in a position to be disengaged from between said engagement fingers;
  means for detecting when said cartridge is in a position to be disengaged from between said engagement fingers;
  means responsive to said detecting means for withdrawing said engagement fingers from said changer grip notches.

27. The apparatus of claim 26, wherein said engagement fingers have opposing first and second planar surfaces which are both parallel to said direction of finger travel, a third planar surface which is perpendicular to said first and second planar surfaces, and a fourth surface which is oriented at a 45 degree angle with respect to said direction of finger travel.

28. The apparatus of claim 27, wherein said first surface is contiguous with said fourth surface, said fourth surface is contiguous with said third surface, and said third surface is contiguous with said second surface.

29. The apparatus of claim 26, wherein said means for withdrawing said engagement fingers from said changer grip notches comprises means for rotating each of said engagement fingers about an axis parallel to said direction of cartridge approach.

30. The apparatus of claim 26, wherein said means for withdrawing said engagement fingers from said changer grip notches further comprises:
  actuator means responsive to said detecting means;
  linkage means connected to said actuator means and responsive thereto for rotating said engagement fingers between an engagement position and disengagement position.

31. The apparatus of claim 30, wherein said linkage means comprises two linkage members, and wherein said engagement fingers are carried on respective ones of said linkage members.

32. The apparatus of claim 26, wherein said means for urging said engagement fingers into said changer grip notches of said cartridge comprise resilient biasing means.

33. The apparatus of claim 26, wherein at least one of said engagement fingers is carried on ram means provided for closing a tape drive door.

34. Apparatus for engaging and disengaging a cartridge of magnetic tape upon which information is storable and for transporting said cartridge from a first location to a second location, said apparatus comprising:
  frame means;
  a pair of engagement fingers carried on said frame means, said engagement fingers being configured upon engagement of extend into changer grip notches provided on a cartridge, at least one of said engagement fingers being carried on a portion of said frame means provided for closing a tape drive door;
  means for urging said pair of engagement fingers into said changer grip notches provided on said cartridge;
  means for detecting when said cartridge is in a position to be disengaged from between said engagement fingers;
  means responsive to said detecting means for withdrawing said engagement fingers from said changer grip notches.

35. A method of engaging and disengaging a cartridge of magnetic tape, said method comprising:
  extending a pair of engagement fingers carried on frame means into changer grip notches provided on a cartridge, said engagement fingers being configured upon engagement to extend into changer grip notches provided on said cartridge and to remain at least partially extended therein after engagement despite further travel by said cartridge in said direction of cartridge approach;
  urging said engagement fingers into said changer grip notches provided on said cartridge as said cartridge approaches said frame means in a direction of cartridge approach;
  moving said frame means whereby said cartridge engaged between said pair of engagement fingers is transported from a first location to a second location;
  detecting when said cartridge is in a position to be disengaged from between said engagement fingers by detecting a change in the size of a gap between said cartridge and a cartridge reference surface provided on said frame means; and, withdrawing said engagement fingers from said changer grip notches in response to said detecting means.

36. The method of claim 35, wherein said step for detecting when said cartridge is in a position to be disengaged from between said engagement fingers comprises means for detecting a change of a predetermined magnitude in the size of a gap between said cartridge and a cartridge reference surface provided on said frame means.

37. The method of claim 35, wherein said step of withdrawing said engagement fingers from said changer grip notches comprises rotating each of said engagement fingers about an axis parallel to said direction of cartridge approach.

38. A method of engaging and disengaging a cartridge of magnetic tape upon which information is storable, said method comprising:

extending a pair of engagement fingers carried on frame means into changer grip notches provided on said cartridge, said engagement fingers being configured upon engagement to extend into changer grip notches provided on a cartridge, each of said engagement fingers being carried by said frame means in a manner whereby said engagement fingers are extendable along a direction of finger travel, said direction of finger travel being about about 45 degrees with respect to direction of cartridge approach;

urging said pair of engagement fingers into said changer grip notches provided on said cartridge as said cartridge approaches said frame means in a direction of cartridge approach;

moving said frame means whereby said cartridge engaged between said pair of engagement fingers is transported from a first location to a second location;

detecting when said cartridge is in a position to be disengaged from between said engagement fingers;

withdrawing said engagement fingers from said changer grip notches in response to said detecting means.

39. The method of claim 38, wherein said step of withdrawing said engagement fingers from said changer grip notches comprises rotating each of said engagement fingers about an axis parallel to said direction of cartridge approach.

40. A method of engaging and disengaging a cartridge of magnetic tape upon which information is storable, said method comprising;

extending a pair of engagement fingers carried on a frame means into changer grip notches provided on a cartridge;

urging said pair of engagement fingers into said changer grip notches provided on said cartridge;

moving said frame means whereby said cartridge engaged between said pair of engagement fingers is transported from a first location to a second location;

detecting when said cartridge is in a position to be disengaged from between said engagement fingers;

withdrawing said engagement fingers from said changer grip notches in response to said detecting means; and, using said frame means upon which said engagement fingers are carried to close a tape drive door.

* * * * *